(12) United States Patent
Gali et al.

(10) Patent No.: US 12,406,563 B2
(45) Date of Patent: *Sep. 2, 2025

(54) SMART SURVEILLANCE SYSTEM FOR SWIMMING POOLS

(71) Applicant: POOL KNIGHT, LLC, Tampa, FL (US)

(72) Inventors: Ramy R. Gali, Lake Worth, FL (US); Phillip E. Matar, Tampa, FL (US); David C. May, The Villages, FL (US)

(73) Assignee: POOL KNIGHT, LLC, Tampa, FL (US)

( * ) Notice: Subject to any disclaimer, the term of this patent is extended or adjusted under 35 U.S.C. 154(b) by 668 days.

This patent is subject to a terminal disclaimer.

(21) Appl. No.: 17/217,144

(22) Filed: Mar. 30, 2021

(65) Prior Publication Data

US 2021/0241597 A1 Aug. 5, 2021

Related U.S. Application Data

(63) Continuation-in-part of application No. 16/774,933, filed on Jan. 28, 2020, now Pat. No. 10,964,187.

(Continued)

(51) Int. Cl.
*G08B 21/08* (2006.01)
*G06T 7/70* (2017.01)
(Continued)

(52) U.S. Cl.
CPC .............. *G08B 21/086* (2013.01); *G06T 7/70* (2017.01); *G10L 17/22* (2013.01); *H04N 7/18* (2013.01); *G06T 2207/30232* (2013.01)

(58) Field of Classification Search
CPC ...... G08B 21/086; G08B 25/002; G06T 7/70; G06T 2207/30232; G10L 17/22;
(Continued)

(56) References Cited

U.S. PATENT DOCUMENTS 5,631,630 A 5/1997 McSweeney
6,263,311 B1 * 7/2001 Dildy ...................... G10L 17/00
704/247

(Continued)

FOREIGN PATENT DOCUMENTS

CN 103440735 12/2013
CN 104524747 4/2015
(Continued)

*Primary Examiner* — Joseph H Feild
*Assistant Examiner* — Sharmin Akhter
(74) *Attorney, Agent, or Firm* — Terry M. Sanks, Esq.; Beusse Sanks, PLLC

(57) ABSTRACT

A swimming pool monitoring system including an imaging sensor for detecting the presence of an object within a defined perimeter of the swimming pool and a computer system operatively coupled to the imaging sensor with a non-transitory computer readable medium storing a program causing the computer system to execute processing to determine when an object is moving within a field of view of the imaging sensor once detected by the imaging sensor, to determine an angle of the object relative to the imaging sensor and to determine a range of the object relative to the imaging device to include a determination of a size of object for providing an alarm when the object approaches within a predetermined distance of the pool edge.

16 Claims, 20 Drawing Sheets

Related U.S. Application Data

(60) Provisional application No. 62/798,017, filed on Jan. 29, 2019.

(51) Int. Cl.
   *G10L 17/22* (2013.01)
   *H04N 7/18* (2006.01)

(58) Field of Classification Search
   CPC .......... G10L 17/00; H04N 7/18; H04N 7/181; H04N 7/188; G06V 20/52; G06V 40/172; G06F 3/167
   See application file for complete search history.

(56) References Cited

U.S. PATENT DOCUMENTS

| | | | |
|---|---|---|---|
| 7,138,921 B1 | 11/2006 | Fontaine | |
| 7,317,406 B2 | 1/2008 | Wolterman | |
| 8,669,876 B2 | 3/2014 | Anderson et al. | |
| 9,049,352 B2 | 6/2015 | Scalisi et al. | |
| 9,928,719 B1 | 3/2018 | Webb | |
| 9,953,506 B2 | 4/2018 | Zhang et al. | |
| 10,026,283 B1 | 7/2018 | Liu et al. | |
| 10,068,445 B2 | 9/2018 | Nongpiur et al. | |
| 10,666,913 B1* | 5/2020 | Siminoff | H04N 7/186 |
| 2003/0156027 A1 | 8/2003 | Seo | |
| 2005/0225443 A1* | 10/2005 | Lerg | G08B 1/08 |
| | | | 342/126 |
| 2006/0007308 A1* | 1/2006 | Ide | H04N 23/61 |
| | | | 348/E7.086 |
| 2008/0048870 A1 | 2/2008 | Laitta et al. | |
| 2008/0211921 A1* | 9/2008 | Sako | H04N 23/64 |
| | | | 348/E5.025 |
| 2008/0258907 A1 | 10/2008 | Kaipaxis | |
| 2010/0294915 A1* | 11/2010 | Williams | G01J 5/08 |
| | | | 315/149 |
| 2013/0106610 A1 | 5/2013 | Pratt | |
| 2014/0267736 A1* | 9/2014 | DeLean | G06V 40/103 |
| | | | 348/152 |
| 2015/0092055 A1* | 4/2015 | Scalisi | G08B 21/088 |
| | | | 348/143 |
| 2015/0173993 A1* | 6/2015 | Walsh | A63B 23/03508 |
| | | | 414/4 |
| 2016/0093198 A1 | 3/2016 | Tung et al. | |
| 2016/0142597 A1* | 5/2016 | Warren | G06F 21/86 |
| | | | 348/143 |
| 2016/0180239 A1 | 6/2016 | Frankel et al. | |
| 2016/0307420 A1 | 10/2016 | DeLean | |
| 2016/0364972 A1 | 12/2016 | Torti | |
| 2017/0018170 A1 | 1/2017 | Sayavong et al. | |
| 2017/0345151 A1* | 11/2017 | Hornung | G11B 27/28 |
| 2018/0082436 A1* | 3/2018 | Hattori | G06T 1/60 |
| 2018/0096569 A1 | 4/2018 | Eaton | |
| 2018/0120661 A1* | 5/2018 | Kilgore | H04N 23/11 |
| 2019/0205608 A1 | 7/2019 | Weitzman | |
| 2020/0246690 A1 | 8/2020 | Weitzman | |

FOREIGN PATENT DOCUMENTS

| | | |
|---|---|---|
| CN | 205354285 | 6/2016 |
| CN | 106971508 | 7/2017 |
| WO | 2010078617 | 7/2010 |
| WO | 2017130187 | 8/2017 |

\* cited by examiner

700

FOV (FIELD OF VIEW) OVERVIEW

PIR- 110 DEGREES (HALF 55) (90-55=35, 90+55=145) FIELD OF VIEW (FOV)

USONIC- 50 DEGREES (HALF 25) (90-25=65, 90+25=115) FOV

PIXY- 75H x 47V DEGREES (HALF 37.5) (90-37.5=52.5, 90+37.5=127.5) FOV (HOR VS. VERT)

RPL NOIR V2- 62.2H x 48.8V DEGREES (HALF 31.1) (90-31.1=58.9, 90+31.1=121.1) FOV (HOR VS. VERT)

RANGE:
-PIR: 20M / 65.5 FT/ 787 IN
-USONIC: 4.5M / 14.8 FT/ 177 IN

SMART SURVEILLANCE SYSTEM FOR SWIMMING POOLS

CROSS-REFERENCE TO RELATED APPLICATIONS

This application is a Continuation-In-Part of U.S. application Ser. No. 16/774,933 filed Jan. 28, 2020, now U.S. Pat. No. 10,964,187 issued Mar. 30, 2021, which claims the benefit of U.S. Provisional Application No. 62/798,017 filed Jan. 29, 2019, the entirety of which is incorporated by reference.

BACKGROUND

Embodiments relate to a smart unauthorized object pool-perimeter breach alert system, method and computer readable medium to detect unauthorized and unknown objects breaching a perimeter of a pool.

Every day, about 10 people die from unintentional drowning. Of these, it is estimated that 2 are children aged 14 or younger. Drowning ranks fifth among the leading causes of unintentional injury death in the United States. From 2005-2014, there were an average of 3,536 fatal unintentional drownings (non-boating related) annually in the United States, about 10 deaths per day. About 1 in 5 people who die from drowning are children 14 and younger. For every child who dies from drowning, another 5 receive emergency department care for non-fatal submersion injuries.

More than 50% of drowning victims treated in emergency departments (EDs) require hospitalization or transfer for further care (compared with a hospitalization rate of about 6% for all unintentional injuries). These non-fatal drowning injuries can cause severe brain damage that may result in long-term disabilities such as memory problems, learning disabilities, and permanent loss of basic functioning (e.g., permanent vegetative state). If a child falls into a pool, it takes less than 2 minutes for unconsciousness to set in and 3 to 5 minutes for brain damage to begin.

Some pool security safety devices employ sensors that are located right at the pool entry point to detect a drowning where emergency life-saving actions need to be taken without delay. Additionally, most pool security safety devices employ only one sensor type which in many cases is not optimal for the tracked object (baby, child, elderly, etc.) and end up producing many frustrating false positives to the end user, further delaying or worst case, negating positive life-saving actions to the drowning baby.

Other pool security safety devices use sensors that provide 3 or 4 decision data points (warm body has entered the area, something has breached pool surface sensors, etc.). Thus, it has limited data to present to the user that incurs many false positives. As a result, users have low confidence and continually diminishing confidence in these systems. These systems respond to "a potential drowning is underway." Thus, emotion is high, and mistakes are prevalent.

A system is needed to automatically sense and calculate a moving image object's range, height and width measurement estimates. The inventors discovered that prior art approaches provide for autonomously sensing, but such approaches require moving a hand-held/mobile camera (forward-step or look-down, etc.), refocusing the camera after movement, using 2 camera lens or placing an in-image measurement reference object within the field of view. Each of these approaches is unusable for an autonomous fixed mount and fixed single lens system.

Therefore, users of swimming pools would benefit from an autonomous sensing method and system that is autonomous while the imaging device is at a fixed location where a fixed single lens may be utilized in place of a plurality of lenses based on movement of the imaging device.

SUMMARY

Embodiments relate to smart unauthorized object pool-perimeter breach surveillance and alert system, method and computer system to detect and provide an alarm when an unauthorized object breaches a perimeter of a pool. In one embodiment, the system incorporates a plurality of sensor devices, sometimes referred to simply as sensors, for monitoring a perimeter around a swimming pool. Perimeter as used herein means a defined area or plurality of area zones surrounding a pool and is extended away from the pool a sufficient distance to allow a warning or alert to be generated before an approaching object, such as a small child, reaches an edge of the pool and may enter into the water in the pool. The sensors may comprise infrared detectors or cameras, video sensors or cameras, auditory sensors, olfactory sensors, and ultrasonic sensors. The sensors may be incorporated into the system in a form to create a geo-position sensor or detector. Each of the sensors is coupled, either by direct wiring or through a Bluetooth® broadcast and reception system or other suitable communication system to the computer system. The computer system operates to utilize signals from the sensors to detect and identify authorized and unauthorized objects entering into the monitored perimeter of the pool.

The computer system includes conventional computer elements such as a processor for executing computer programs stored in RAM and ROM modules and in a writable mass storage media. The computer system may also be adapted for Cloud storage. To this end, the computer system includes an accessible and rewritable database for storage of biometric data related to objects likely to entering into the perimeter. The term "objects" will be understood to mean animate and inanimate objects, but in most instances is used to refer to persons or animals, it being understood that an alarm may be necessary when a small child, or a disabled person, or a dementia victim may be entering the pool area or perimeter without proper protection or permission. The database may store facial images of authorized objects that are allowed to be in the pool perimeter. The facial images can be compared to facial images stored in the database for identifying authorized persons. The computer system has conventional input apparatus to allow the database to be updated by entering new facial images or other biometric data into the database. The biometric data may include auditory data for voice recognition so that the computer system functions can be controlled by authorized persons, the term "persons" being broadly encompassed by the term "objects."

The ability to update the computer system database may be limited to certain authorized persons, sometimes identified as administrators. In addition to voice recognition, the computer system may receive input from olfactory sensors and maintain a database of known smells or odors to further help in identifying authorized or unauthorized objects entering into the pool perimeter. Olfactory biometrics may assist in identifying a crawling baby in comparison to a small dog or cat. The ultrasonic and video sensors may also determine the orientation of an object entering into the pool perimeter, such as a standing versus crawling baby or a person who may have fallen within the perimeter. Briefly, the disclosed invention utilizes a plurality of different sensors to detect and identify objects, i.e., persons and animals, entering into a perimeter of a pool and provides an alert or alarm to responsible persons to minimize the likelihood of person or animal falling into the water within the pool and possibly drowning. The identification protocol uses different sensors to minimize false alarms so that it reduces the likelihood that the system will be disabled when the pool is being used by authorized objects, such as people or pets. As used herein, the term "object" generally refers to a living person, but may also include pets, such as cats or dogs. The term "unauthorized objects" generally includes "unknown objects."

However, an unauthorized object may include an identified baby or elderly person living in a household having a pool that is being monitored. An unknown object is used to refer to an object intruding into the pool perimeter where the object is not identified in the computer database. The system may be programmed to provide a different type of warning that distinguishes between an unauthorized object and an unknown object. The computer database has conventional input means for allowing biometric data to be entered into the database by an authorized person. For example, the database may be updated by entering new facial images, olfactory scents, or auditory sound data. Each of these biometric data is associated with a corresponding authorized or unauthorized object to allow the computer system identify more accurately objects entering the monitored perimeter of the pool so that an alarm may be inhibited when the detected object is an authorized object. Similarly, the computer system can respond to detection of an unauthorized object by identifying the object and program an appropriate alert of alarm. It may be appropriated to provide a more urgent alarm if the unauthorized object is a baby or small child than might be desirable if the unauthorized object is an elderly person approaching a shallow end of the pool. Thus, the system can adapt to different types and identities of objects and determine the level of alert that is appropriate for detected object.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1A:
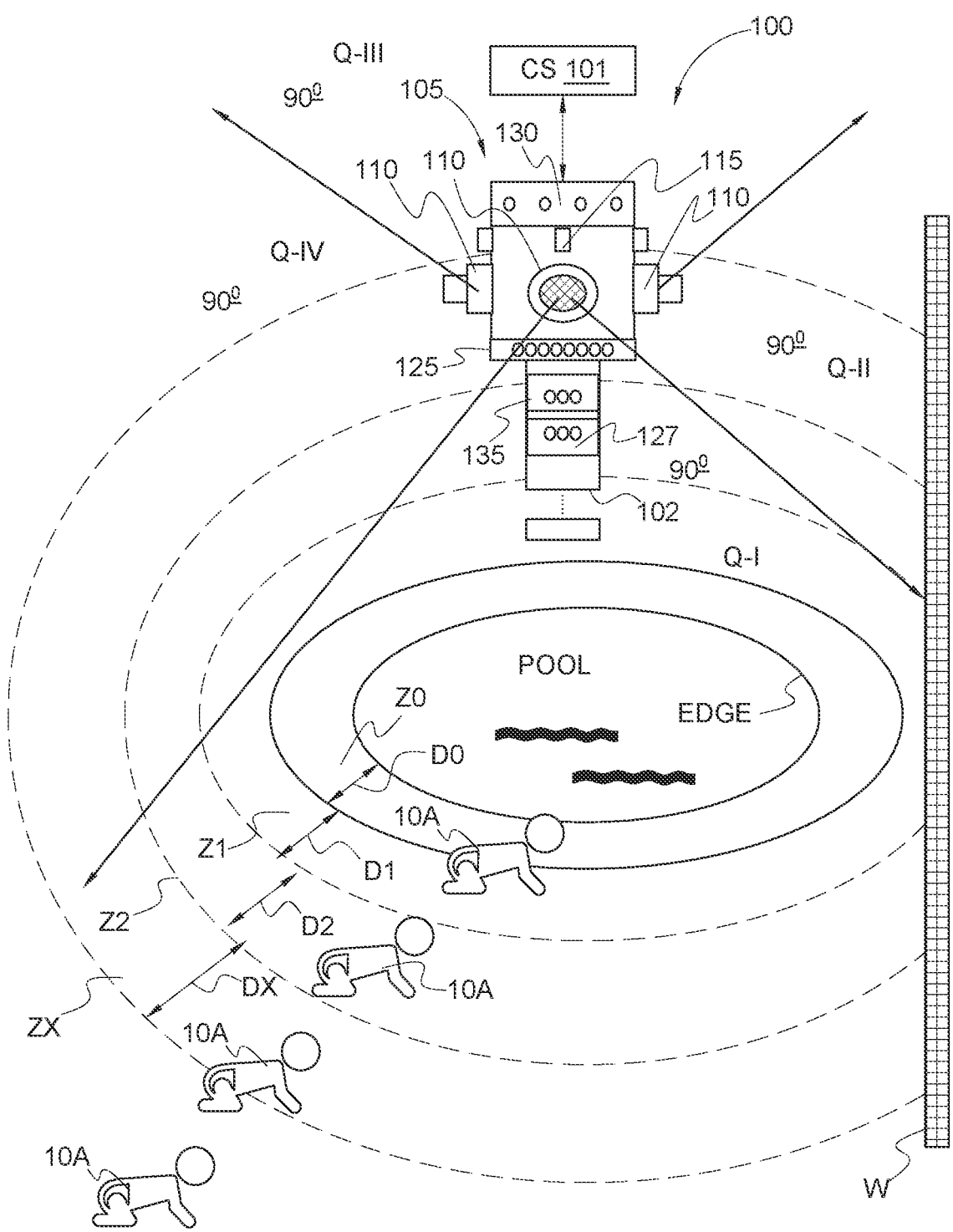
FIG. 1A illustrates a smart unauthorized object pool-perimeter breach alert system with an unauthorized object near the perimeter of the pool in a first quadrant or sector.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1A illustrates a smart unauthorized object pool-perimeter breach alert system 100 with an unauthorized object near the perimeter of the pool in a first quadrant Q-I. The quadrant may be a sector. The system 100 is configured to be installed at least in part at some location in the surrounding environment of a pool. The system 100 may be configured to detect authorized and unauthorized object near the perimeter of the pool up to 360°. In some embodiments, the installation of system 100 may only detect authorized and unauthorized object near the perimeter of the pool up to 180°, for example, because of obstructions in proximity to the pool. In other embodiments, the system 100 may be configured to detect authorized and unauthorized objects near the perimeter of the pool up to 270°.

Pools can be installed a few feet from a structure such as a home, garage, and pool house, for example, with ingress and egress. In other embodiments, a pool may be installed 50-100 feet from the home or other nearest building with ingress and egress. Thus, the installation of the system 100 may be placed within the environment to capture up to 360° so that unauthorized subjects approaching the pool from any direction up to 360° can be readily detected and especially points of ingress to the perimeter of the pool.

The system 100 may include a support structure 102 configured to have mounted thereon a sensor suite 105. The sensor suite 105 may include one or more infrared imaging sensors 110. In the illustration, three IR imaging sensors 110 are shown capturing images in sectors or quadrants Q-I, Q-II, and Q-IV. The sensors for sector or quadrant Q-III are not shown in this illustration. In some embodiments, each IR imaging sensors 110 may have a field of view (FOV) of approximately 90°. However, for sectors smaller than 90°, the FOV may be smaller. The IR image represents a heat signature. In some embodiments, the FOV of the imaging sensors 110 may overlap with an adjacent imaging sensor 110 so that there are no blind spots in the space around the perimeter of the pool. In other embodiment, the FOV of the IR imaging sensors 110 may be 180°. Accordingly, the system 100 would require less IR imaging sensors. In other embodiments, each sector or quadrant may have more than one IR imaging sensor. The sensor suite 105 may include red, green, blue (RGB) imaging sensors 115. The RGB image captured by the imaging sensors 115 may be used to compare some of the stored signatures of the local environment from a current image to remove those pixels of the local environment to isolate the image data of a current subject. As described herein, an image may include one or both of an RGB image data and an IR image data. The image data may include RGB image data and/or IR image data. Many high-quality security cameras are available to act as both day and night imaging sensors such as, for example, a Nest Cam Outdoor Security camera with 1080p HD night vision and 130-degree wide angle view.

In some embodiments, the IR imaging sensors 110 are used during the night hours or conditions so that a heat signature of breaching objects can be detected in the dark. In some embodiments, the RGB imaging sensors 115 are used during the daylight hours since the image quality by RGB imaging sensors 115 deteriorates during low light (night time) conditions.

The sensor suite 105 may include one or more auditory sensors 125 to detect ambient sounds in the environment in proximity to the pool, including voice sounds or auditory sounds of objects and ambient sounds naturally occurring. In some embodiments, auditory sensors 125 may be installed in at least one quadrant to detect incoming ambient sounds in the perimeter of the pool. In some embodiments, the auditory sensors 125 may be used to identify authorized and unauthorized subjects in the perimeter of the pool using a voice signature. The auditory sounds of a subject may include audible sounds from an unauthorized animal, such as a pet, or other unauthorized persons such as a baby, child, elderly adult, disabled or person suffering from dementia.

The sensor suite 105 may include one or more olfactory sensors 127 to detect specific object emanating smells in the environment. The sensor suite 105 may include local ambient environment condition (LAEC) sensors 130. The LAEC sensors 130 will be described in more detail in relation to FIG. 3A.

The sensor suite 105 may include geo-position sensors 135 to determine a range of an unauthorized object 10A relative to the edge of the pool or other boundaries. The range of the unauthorized object 10A may be used in determining the timing of alerts and/or sequence of alert communications as the estimated time-of-arrival or range from the subject 10A to zone Z0 or the edge of the pool decreases. The geo-position sensors 135 may include, without limitation, an ultrasonic range sensor 360 (FIG. 3B).

The system 100 may include a computer system (CS) 101 in communication with the sensor suite 105. The computer system 101 will be described in more detail in relation to FIG. 6. The computer system 101 may be remote from the sensor suite 105. The computer system 101 may be distributed such that parts of the computer system 101 are integrated with the sensor suite 105 while other parts of the computer system 101 are remote. One or more distributed parts of the computer system 101 may provide the user with user interfaces for setting up the system 100 and uploading voice signatures, face recognition signatures, object specific smell signatures and/or scene recognition signatures. The user interfaces may allow the computer system to receive alert recipient lists, mode of delivery of the alert, etc. The distributed parts of the computing system 101 may communicate with each other using wired or wireless communication modalities including, without limitation, WIFI.

In FIG. 1A, by way of non-limiting example, the perimeter surrounding the pool is marked by zones Z0, Z1, Z2, . . . , ZX wherein X may be a non-zero integer. Zone Z0 is closest to the pool and may include the edge of the pool. Zone Z0 may have the distance DO between the end of Zone Z1 or beginning of Zone Z0 and the edge of the pool or the end of Zone Z0. Zone Z1 may have the distance D1 between the end of Zone Z2 or beginning of Zone Z1 and the end of Zone Z1. Zone Z2 may have the distance D2 between the end of Zone ZX or beginning of Zone Z2 and the end of Zone Z2. Zone ZX may have the distance DX between the beginning of Zone ZX and the end of Zone ZX.

In the example, Zone 1 may surround Zone Z0 up to 360°. The distance D1 may be the same around Zone Z0 or may be varied. For example, some area of D1 may be narrower in places and/or wider in other places. Likewise, the distance D2 may be the same around Zone 1 or may be varied. The distance DX may be the same around Zone 2 or previous zone or may be varied. The distances DO, D1, D2, . . . , DX may be the same or different.

In FIG. 1A, the unauthorized object 10A is shown moving from an area outside of Zone ZX through Zone ZX, Zone Z2, Zone Z1 and to Zone Z0 wherein Zone Z0 is immediately adjacent to the pool. An unauthorized object 10A in Zone Z0 may indicate an imminent pool breach. By way of non-limiting example, Zone ZX may be used to detect when an unauthorized object 10A initially breaches a perimeter zone of the pool. Each zone moving closer toward the pool or Zone Z0 may raise the alert level as each subsequent zone is breached. For example, Zone ZX may have the lowest alert level while Zone Z0 has the highest alert level. Each alert level may include a different sequence of alerts, a different alert message or alert indicator, and/or a different list of alert recipients, by way of non-limiting example.

Zones ZX, Z2, and Z1 on the right side of figure are discontinued by virtue of a structure, such as wall W. Wall W is just an example of a possible structure in a pool area. Accordingly, the zones discontinued, on the side of the wall opposite the side within the pool perimeter environment, may not require ranging and/or detection of unauthorized subjects. The zones around the perimeter may include those zones which have possible ingress to the pool.

By way of another example, assume that Zone Z1 has a barrier such a fence which can be removed when the pool is in use. The fence, when deployed, may designate a No-Go-Zone where no persons should breach. The term "no persons" may include those persons without a previously stored image, sometimes referred to as unknown persons. In some embodiments, those unknown persons may still be detected, if they breach the No-Go-Zone (the area beyond the fence). Sometimes, an unauthorized object may be an unknown person not yet known to the pool owners. For example, an unknown subject may be an adult neighbor, neighborhood teens, and small children entering the perimeter of the pool without permission. The system 100 may include a list of authorized objects so that anyone detected, regardless of size, which are not on the authorized subjects list can be considered an "unauthorized object." For example, the current facial identification database may include pool owner family members including authorized mother, father and other responsible and capable family members (teenagers). It may also include unauthorized family members that are not allowed in the pool area unattended by an authorized adult. This feature may serve to prevent drowning by persons breaching the security fence The system 100 may include selectable modes of operation which allow unidentified persons to be detected without the cause for alarm. For example, if an unknown person is accompanied by an authorized person in the perimeter of the pool, an alert may not be required.

Figure 1B:
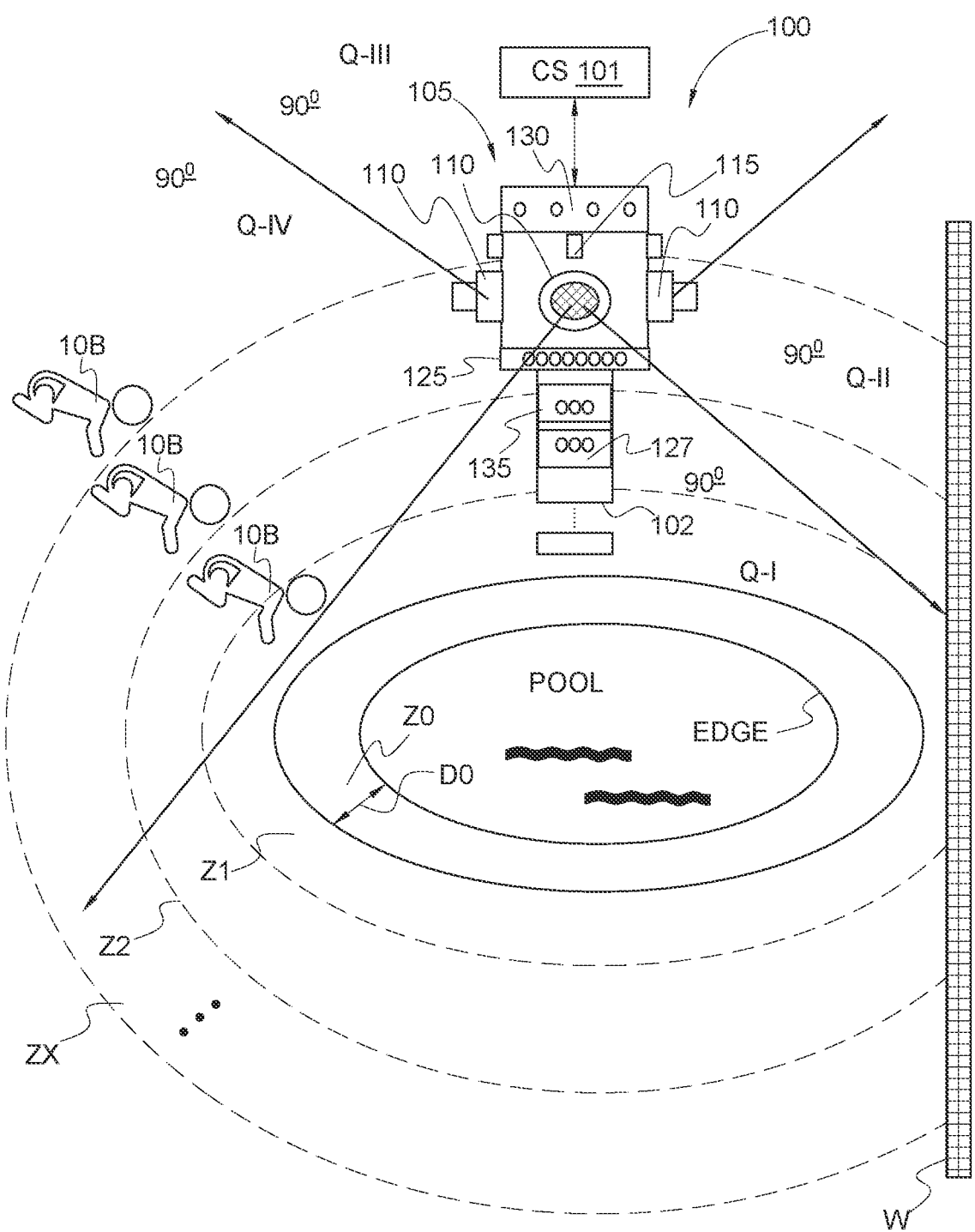
FIG. 1B illustrates a smart unauthorized object pool-perimeter breach alert system with an unauthorized object near the perimeter of the pool in a fourth quadrant or sector.

FIG. 1B illustrates a smart unauthorized object pool-perimeter breach alert system 100 with an unauthorized object 10B near the perimeter of the pool in a fourth sector or quadrant Q-IV. As described in relation to FIG. 1A, the area represented by sector or quadrant Q-IV has egress to the pool. By way of non-limiting example, egress to the perimeter of the pool may be from a door located in a kitchen area through which the unauthorized object 10B may exit to enter sector or quadrant Q-IV. On the other hand, egress to the perimeter of the pool may be from a door located in a laundry room through which the unauthorized object 10B may exit to enter sector or quadrant Q-I.

In some embodiments, the wall may represent a portion of a screen enclosure around a pool. Screen enclosures may connect to buildings to provide egress from the building into the pool area through a doorway, for example, while the enclosure blocks access along other sides surrounding the pool. Accordingly, depending on installation of system 100, imaging and ranging functions may only require 180° of observation instead a full 360°.

Figure 2:
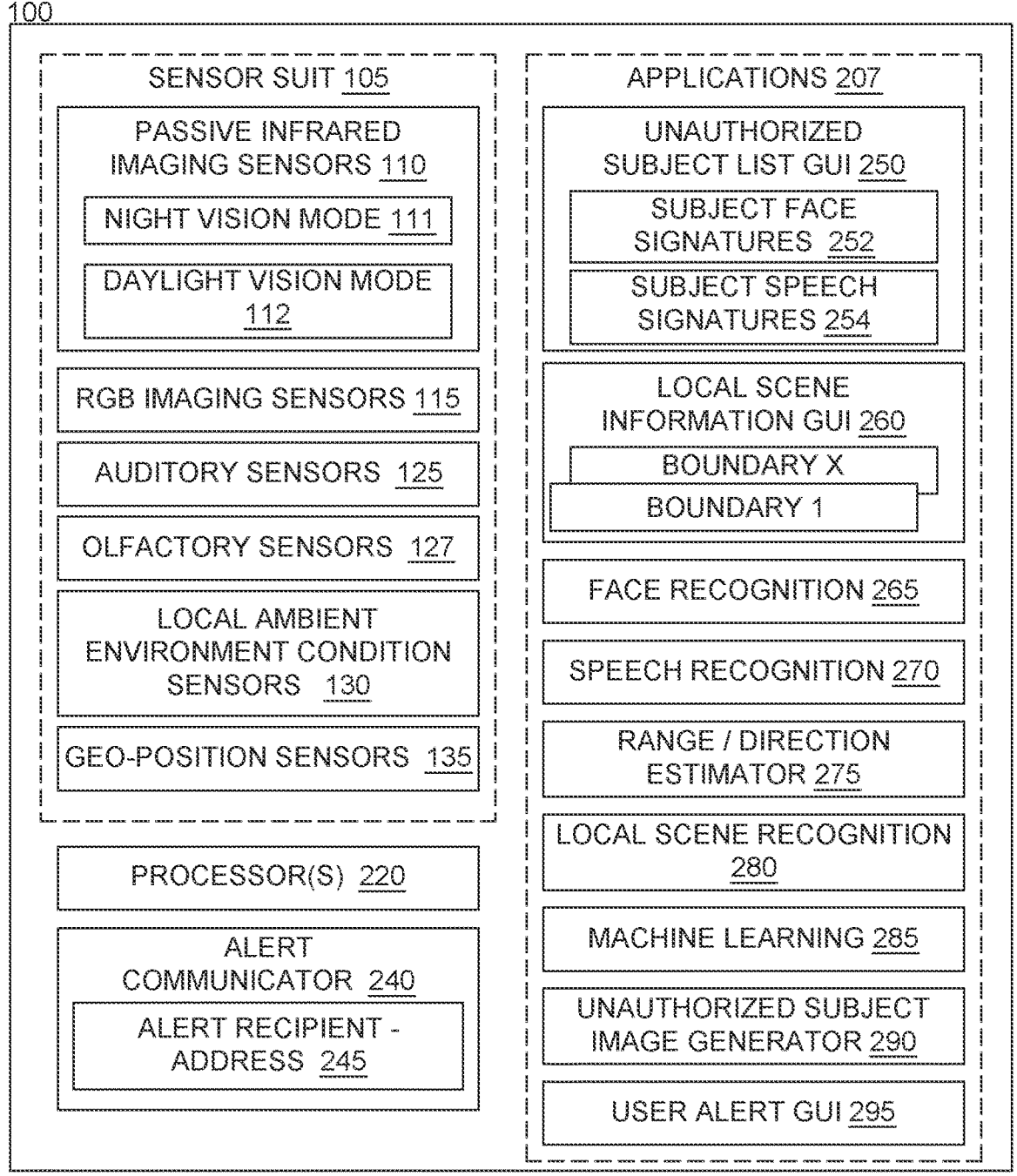
FIG. 2 illustrates a block diagram of the smart object unauthorized pool-perimeter breach alert system.

FIG. 2 illustrates a block diagram of the smart unauthorized object pool-perimeter breach alert system 100 of FIGS. 1A and 1B. The sensor suite 105 may include sensor types such as infrared (IR) imaging sensors 110, RGB imaging sensors 115, auditory sensors 125, olfactory sensors 127, local ambient environment condition (LAEC) sensors 130, and geo-position sensor 135. The suite 105 may distribute multiple sensors of some or all types up to 360°. For example, the sensor suite may include one geo-position sensor 135 configured to perform ranging up to 360°, while each sector or quadrant monitored may include one IR imaging sensor 110 and at least one geo-position sensor 135. The sensor suite 105 may include only one set of LAEC sensors 130 since the environmental conditions would not change quadrant to quadrant.

Each IR imaging sensor 110 may include a night vision mode 111 and a daylight vision mode 112. The system 100 may include one or more processors 220. The one or more processors 220 may be part of the computer system 101. The processor 220 may include imaging processing functions to process both IR images and RGB images. The system 100 may include alert communicator 240 to alert at least one alert recipient 245 at an address according to an identified alert delivery mode. The alert delivery mode may include text messages, a call to a landline phone number, a call to a mobile phone number, communications using voice over Internet protocol (VOIP), and an email to an email address(s).

The system 100 may include applications 207 for performing the functions herein. The applications 207 may include various data sets for access by the applications to be entered by various graphical user interfaces (GUI). For example, the applications 207 may include at least one GUI 250 for entering a subject list GUI 250 identifying those subjects considered unauthorized. In some embodiments, the objects may include both authorized and unauthorized. The object list GUI 250 may include a user interface to establish unauthorized subject face (recognition) signatures 252 and unauthorized object speech (recognition) signatures 254. The object list GUI 250 may include a user interface to establish authorized object face (recognition) signatures 252 and authorized object speech (recognition) signatures 254, in some embodiments.

The GUI 250 may allow a user to capture face signatures 252 using the GUI 250 or select an existing picture to upload the face signature 252. Likewise, the GUI 250 may allow the user to capture voice signatures 254 or select an existing voice signature. Thus, data representative of voice captured in the real-time ambient sounds, via the auditory sensors 125, may be used by the speech recognition module 270 to detect and pair the captured sound to the voice signature of an authorized or unauthorized object during a measurement cycle.

The range/direction estimator 275 may determine a direction of ingress of the unauthorized object using data points collected by one or more sensors of the geo-position (GP) sensors 135. Each GP sensor 135 may provide a sensed signal to the range/direction estimator 275 at the same measurement cycle. The range/direction estimator 275 may include an ultrasonic range measurement module (not shown). The ultrasonic data points are captured by directing ultrasonic frequency waves from at least one ultrasonic ranging sensor 360 (FIG. 3B) into the perimeter of the pool.

For example, each sector or quadrant may include an ultrasonic ranging sensor 360 configured to detect the return of propagated ultrasonic frequency waves. The returning ultrasonic frequency waves are measured by the range/direction estimator 275 to estimate a range of a subject within the perimeter of the pool. Other imaging data may be used in ranging.

The ranging estimations may receive data from the geo-position sensors 135 to provide an estimated time of arrival based at least on one set of data points.

The applications 207 may include a local scene information GUI 260. The local scene information GUI 260 may allow a user to identify one or more boundaries and/or zones in the perimeter of the pool. The GUI 260 may be used to capture local scene information and establish boundaries or zones to establish a hierarchy of alert levels. Nonetheless, only one alert boundary may be established.

The applications 207 may include a face recognition module 265 configured to process data representative of an image of a captured face 58 of the subject 57 (FIG. 5) in the proximity of the pool to determine whether the captured face 58 is recognized as a match to a face signature of an unauthorized subject. The operation of the face recognition module 265 may be described in more detail in relation to FIG. 5. The applications 207 may include a speech recognition module 270 configured to recognize a captured voice signal 58 of the subject 57 (FIG. 5) in the proximity of the pool. The system 100 may use the auditory sensors to detect voice of a subject and environmental sounds which may be extracted or filtered from a received auditory signal during a measurement cycle to isolate the voice of the subject from the ambient environmental sounds.

The applications 207 may include a machine learning module 285. The machine learning module 285 may track data points over time used for alerts to minimize false alarms. The tracked data points may be stored locally or remotely in a cloud server. The applications 207 may include an unauthorized subject image generator 290 based on the captured image data of a detected unauthorized subject at any measurement cycle or when an alert is to be generated. It can be used to detect moving image object behavior, changes to specific object behavior, behavior anomalies, etc. Separate application 207 instances may also be used to provide machine learning data from the auditory and olfactory sensors, as well as to help improve the sensors signature recognition performances.

The applications 207 may include a user alert GUI 295. The application 207 may generate an alert communication to be transmitted to an alert recipient identifying an unauthorized subject in the perimeter of the pool. The alert communication may include an image of the detected unauthorized subject via the user alert GUI 295. The alert communicator 240 transmits, according to an alert delivery mode, a text message, user alert GUI, or email to an identified alert recipient. The alert may be sent to at least one mobile device 30A, computing device 30B, or other communication device set by the recipient. The alert communicator 240 may transmit an alert to a local first responder 30C. The user alert GUI 295 may communicate images with colored annotations showing where the system 100 has detected one or more "signatures of concern" representative of unauthorized subjects in breach of the perimeter of the pool and, in some cases, a pool breach.

The system 100 may be configured to generate a plurality of data points for breach alert generation. By way of non-limiting example, approximately 40 decision data points may be used to attempt to, with high levels of confidence and accuracy, alert users that an unauthorized object ("baby Jane," "grandpa Mike") is about to enter the pool or particular zone in a perimeter adjacent to the pool. The system 100 may leverage smart phones, call lists, HD (High Definition) images and video to give the user (alert recipient) real-time data to formulate an appropriate response once a breach is alerted. For example, a parent may rush to close and lock a pool gate before the baby gets to the pool edge or intercept the baby from its path to the pool.

The system 100 uses the sensor suite 105 and analytic software that attempts to predict if a specific user specified unauthorized subject (baby, elder, puppy, etc.) is attempting to advance towards the pool area or No-Go Zone. Instead of looking at a drowning situation in-process, system 100 may perform a look-ahead process to determine at least one of a direction, range and speed of an unauthorized subject to generate an alert to try to avoid breach of the pool or pool edge. Thus, a drowning situation can be averted, such that the unauthorized subject is detected and apprehended before reaching the water. Rather than alerting the user that a drowning is underway, the system 100 attempts to predict and guide resources to block or intercept unauthorized subjects before a drowning is underway.

The system 100 uses the decision data points (i.e., approximately 40) to achieve a higher level of detail and decision-making accuracy to predict a potential pool breach condition or imminent pool breach condition is about to happen with a specific unauthorized subject (baby, etc.) in an effort to prevent drowning by the unauthorized subject. The system 100 can also detect when a pool is breached presenting a potential drowning condition. The system 100 does more than just detect something in or around the pool. The system 100 progresses up the data gathering and decision-making process to detect, determine orientation and/or direction of, track a range of, recognize and identify an unauthorized subject. The system 100 may first determine gather data points to determine if the subject entering the designated perimeter of the pool is an unauthorized subject. If the subject is determined to be other than an unauthorized subject, the data gathering process may end for that specific subject in the perimeter of the pool. By way of non-limiting example, the system 100 is configured to detect multiple subjects breaching a perimeter of a pool. Such subjects may be authorized or unauthorized.

The system 100 may employ image processing techniques based on a Johnson Criteria and the "DORI" acronym. The image processing techniques may provide a 25% confidence level at the "Detection level" (D) of the image processing technique. The confidence may increase to approximately 50% when the "Orientation level" (O) in an image is examined or detected using the image processing techniques. Then the confidence level may step up to approximately a 75% level when the "Recognition level" (R) of subjects in the image is examined and detected. Additionally, the confidence level may further improve to approximately 100% when the "Identification level" (I) of the subjects in the image is examined. With nearly a 100% level of confidence in a decision to provide an alert reduces false alarms to the end-user.

The system 100 uses warm body IR (Infrared) sensors 110, geo-position sensors 135 (ultrasonic range sensor, visual (RGB) detection sensors and image processing software), auditory sensors 125, and olfactory sensors (smell) 127. Internet data representative of local environment information (time of day, temperature, weather conditions) may allow sensors of the sensor suite 105 to adjust to real-time local environmental conditions (e.g., day versus night, snow, etc.) to optimize captured sensor data integrity of the detected real-time signatures. The real-time signatures are used for comparison with stored signatures of unauthorized subjects.

The system 100 may include a speaker 247 in the perimeter of the pool to alert those in the area. For example, while others are using the pool, an unauthorized subject may still be monitored to generate a local alert of imminent breach of the pool edge by such unauthorized subject to prevent accidental drowning.

Figure 3A:
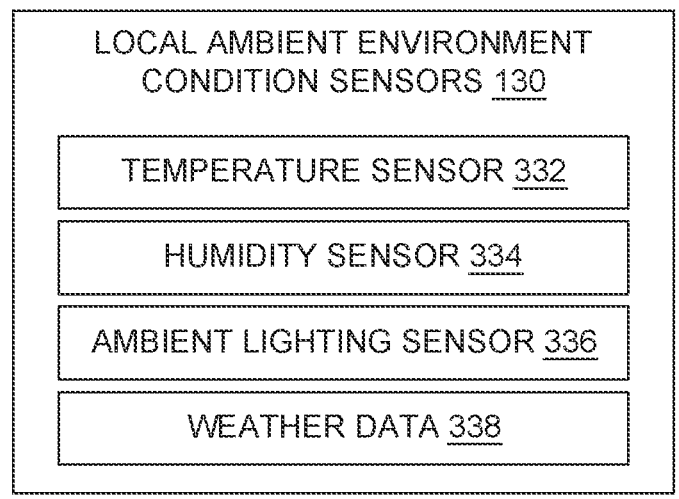
FIG. 3A illustrates a block diagram of the local ambient environment condition sensors.
Figure 3B:
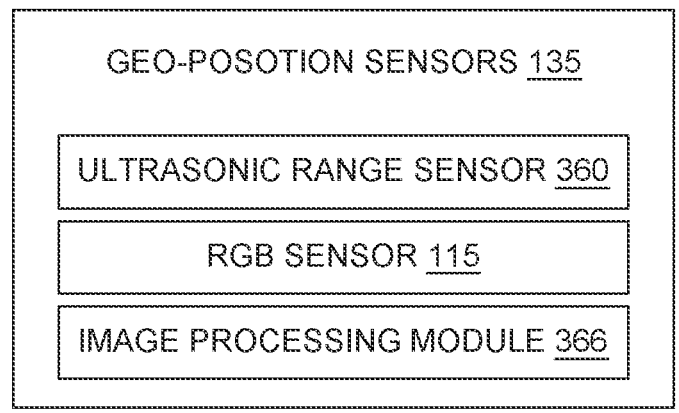
FIG. 3B illustrates a block diagram of geo-position sensors.

FIG. 3A illustrates a block diagram of the local ambient environment condition (LAEC) sensors 130. The LAEC sensors 130 may include a temperature sensor 332 configured to sense the current ambient temperature of the environment associated with the scene. The LAEC sensors 130 may include a humidity sensor 334 configured to sense a quantity of humidity in the environment associated with the scene.

FIG. 3B illustrates a block diagram of geo-position sensors 135. The geo-position sensors 135 may include one or more of an ultrasonic range sensor 360 and image processing module 366. The image processing module 366 may be shared by other sensor types. The geo-position sensors 135 may use image data from one or more RGB imaging sensors 115 for determining geo-position data points. The geo-position sensors 135 may be used in detection and identification of an orientation of subject in the perimeter of the pool, for example. A height from the ground may be determined for use in locating a face of a subject, which may be a potential unauthorized subject. The orientation may include crawling signaling a potential baby or toddler. The system 100 may detect whether the subject is crawling. The orientation may be sitting, such as in a wheelchair. An unauthorized subject may include babies, toddlers, small children and disabled or elderly persons using walking assist devices. Walking assist devices may include wheelchairs, walkers, and canes. Subjects using walking assist devices may trip or fall in the perimeter of the pool. The detected change in orientation of unauthorized subjects with walking assist device may signal a fall in the area of the perimeter of the pool or if the pool was breached.

The LAEC sensors 130 may include ambient lighting sensor 336 configured to sense a quantity of ambient light in the environment associated with the scene. The quantity of light may be a function of daylight, nighttime, dusk and/or dawn. The quantity of ambient light may be a function of natural light from the sun without the addition of supplemental light such as from electrical lighting devices in the environment. During the nighttime hours, the surrounding ambient light may be detected at a higher level with the aid of supplemental lighting. The ambient lighting may control the modes of the IR imaging sensors 110. During low light conditions, the IR imaging sensors 110 may operate in a night vision mode 111. In normal or daylight conditions, the IR imaging sensors 110 may operate in a daylight vision mode 112.

The LAEC sensors 130 may include weather data 338 such as sensed or detected at a remote local weather station. The LAEC sensors 130 may communicate, such as via the Internet, with the weather station to obtain current weather conditions sensed or detected by the weather station. The LAEC sensors 130 may be configured to communicate with the remote weather station to object current weather conditions. The weather conditions may be updated with the reading of the local sensors of system 100. The weather conditions or local ambient environmental conditions may cause the performance of system 100 to be controlled such as in the presence of snow, the presence of fog, high wind conditions, extreme weather conditions, etc. For example, the presence of snow may change the image of the scene. Accordingly, the local scene recognition module 280 may vary a scene signature used in a current breach detection cycle. For example, local scene signatures may include scene signatures for snow conditions, fog conditions, and rain conditions, for example.

Figure 4:
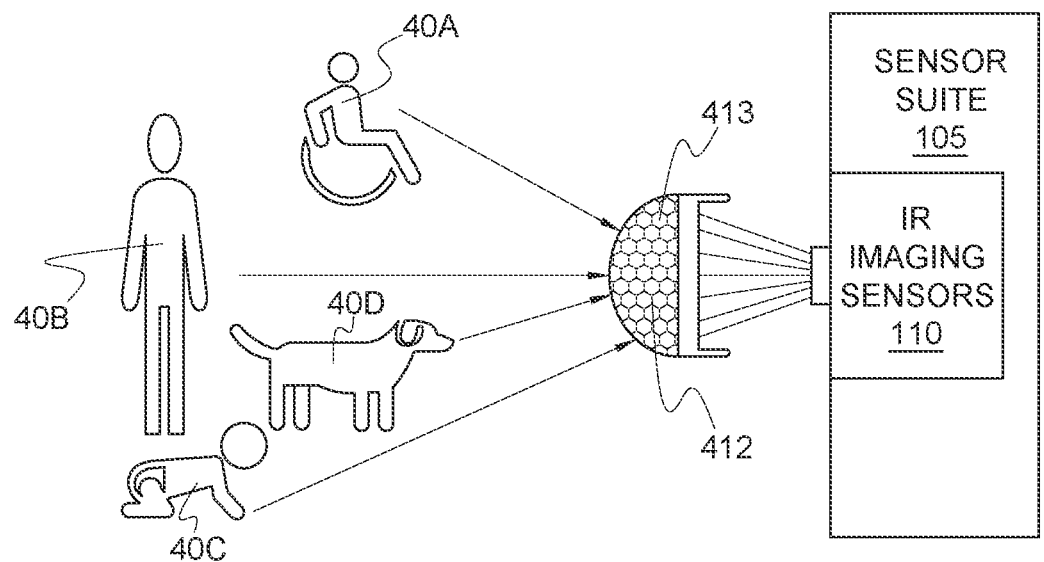
FIG. 4 illustrates a diagram of an infrared imaging sensor detecting authorized and unauthorized objects in a pool area.

FIG. 4 illustrates a diagram of an infrared (IR) imaging sensor 110 detecting authorized and unauthorized subjects in a pool area. The IR imaging sensor 110 may be coupled to a lens 412. The lens 412 may be dome shaped in some embodiments. The lens 412 may include a plurality of Fresnel lens 413 arranged in a dome shape. The light passing through the lens 412 or each Fresnel lens 413 is passed to the IR image sensor 110 to capture the propagated light of the scene. Additionally, the lens 412 or each Fresnel lens 413 may be responsive to infrared (IR) wavelengths to detect a heat pattern within the scene.

By way of non-limiting example, an authorized subject may include an adult 40B. Non-authorized subjects may include, without limitation, disabled persons 40A, children 40C, and animals 40D. Non-authorized subjects may be those subjects which are not capable of swimming in a pool. Some adults may not be able to swim and would also be an unauthorized subject. In some instances, animals 40D which are known to have the capacity to swim may be an authorized subject.

Figure 5:
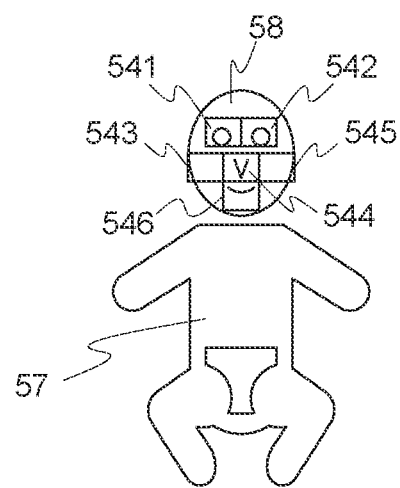
FIG. 5 illustrates a graphical representation of image recognition of an unauthorized subject.

FIG. 5 illustrates a very simplified graphical representation of image recognition of an unauthorized subject 57. The unauthorized subject 57 is a child. Most facial recognition algorithms use over 100 facial data measurement points and use multiple facial images of each authorized and unauthorized object. The Facial Recognition application uses Machine Learning to create an AI dataset that allows the calculation and comparison of facial signatures to provide Facial Recognition of a generic face in a video frame which then leads to Facial Identification of unique faces as members of a pool-owners family. The system 100 may be configured to compare a face (recognition) signature 252 which is associated with unauthorized subject 57. By way of non-limiting example, the face recognition module 265 may be configured to compare stored face signature data with the captured face 58 of the subject 57 in the proximity of the pool. The system 100 may use computer vision to locate the face 58 of the subject 57 for comparing the stored face signature 252 to the instant captured face 58. The face recognition module 265 may locate the eyes 541 and 542 on the face 58 of the subject 57 to compare the eyes of the face signature 252 with the captured image data representative of the eyes 541 and 542 of the subject 57.

The face recognition module 265 may locate the nose 544 on the face 58 of the subject 57 to compare the nose of the face signature 252 with the captured image data representative of the nose 544 of the subject 57. The face recognition module 265 may locate the mouth 546 on the face 58 of the subject 57 to compare the mouth of the face signature 252 with the captured image data representative of the mouth 546 of the subject 57.

The face recognition module 265 may locate the cheeks and/or cheekbones 543 and 545 on the face 58 of the subject 57 to compare the cheeks and/or cheekbones of the face signature 252 with the captured image data representative of the cheeks and/or cheekbones 543 and 545 of the subject 57. Other facial features may also be determined, such as the forehead and chin to name a few.

FIGS. 6-15 display another embodiment of a method to determine a range, or distance, of an object such as, but not limited to, a moving object, from a monitoring or viewing device. In an embodiment, the monitoring device may be a camera or another imaging device or imaging sensor. As explained herein, the range is determined from a "foot" of the camera to a "foot" of the moving object. As explained further herein, once detection of the object occurs, a determination of the object's physical dimensions, such as the width and height measurements, of the object is performed. This information may be used to determine a size of the object which may help determine whether the object is an infant, child or adult. This information allows for determining if the object has entered a surveillance zone and if an alarm should be raised. The alarm may be any variety including, but not limited to, audible, tactile, or illuminated. Furthermore, the alarm subsystem may be arranged to send a message to a remote device such as, but not limited to, a smart phone, computing tablet or desktop computer. If a residence has an alarm system, an embodiment disclosed herein may be part of that alarm system.

Figure 6:
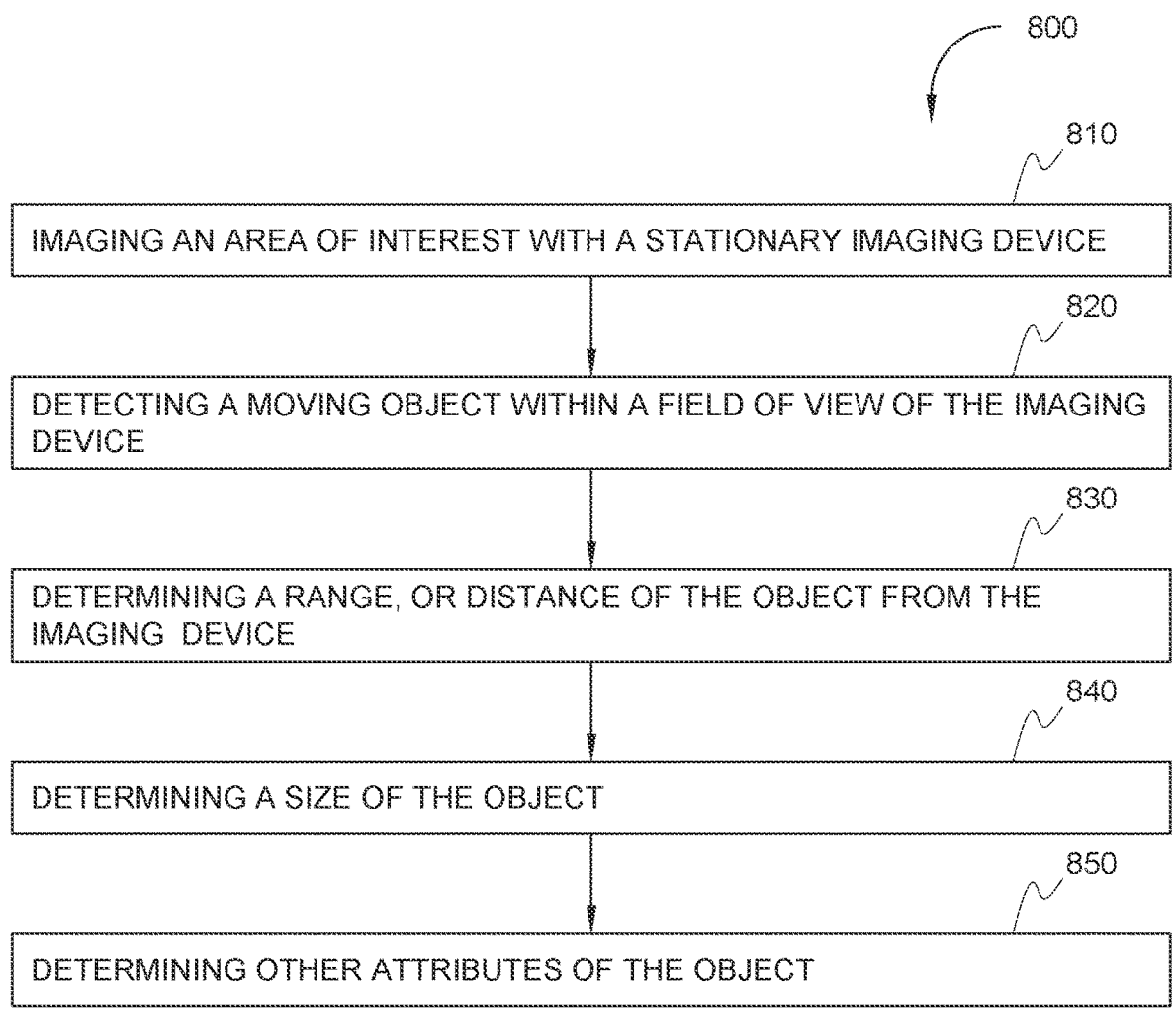
FIG. 6 shows an embodiment of a flowchart showing a method for detecting an object.

FIG. 6 shows an embodiment of a flowchart showing a method for detecting an object. As shown, the method 800 comprises imaging an area of interest with a stationary imaging device, at 810. The method 800 next comprises detecting a moving object within the field of view of the imaging device, at 820. The method 800 next provides for determining a range, or distance of the object from the imaging device, at 830. The method further comprises determining a size of the object, 840. The method 800 may also provide for determining other attributes of the moving object, at 850, such as, but not limited to, whether arms exist on the moving object or legs (collectively limbs), whether the moving object is a human walking or crawling, etc. As disclosed further below, a computing device, typically having a graphics processing unit 620, to find a moving object in the image frame. As used herein, "imaging device" is non-limiting as this may be an imaging sensor 110 as further disclosed herein.

Figure 7A:
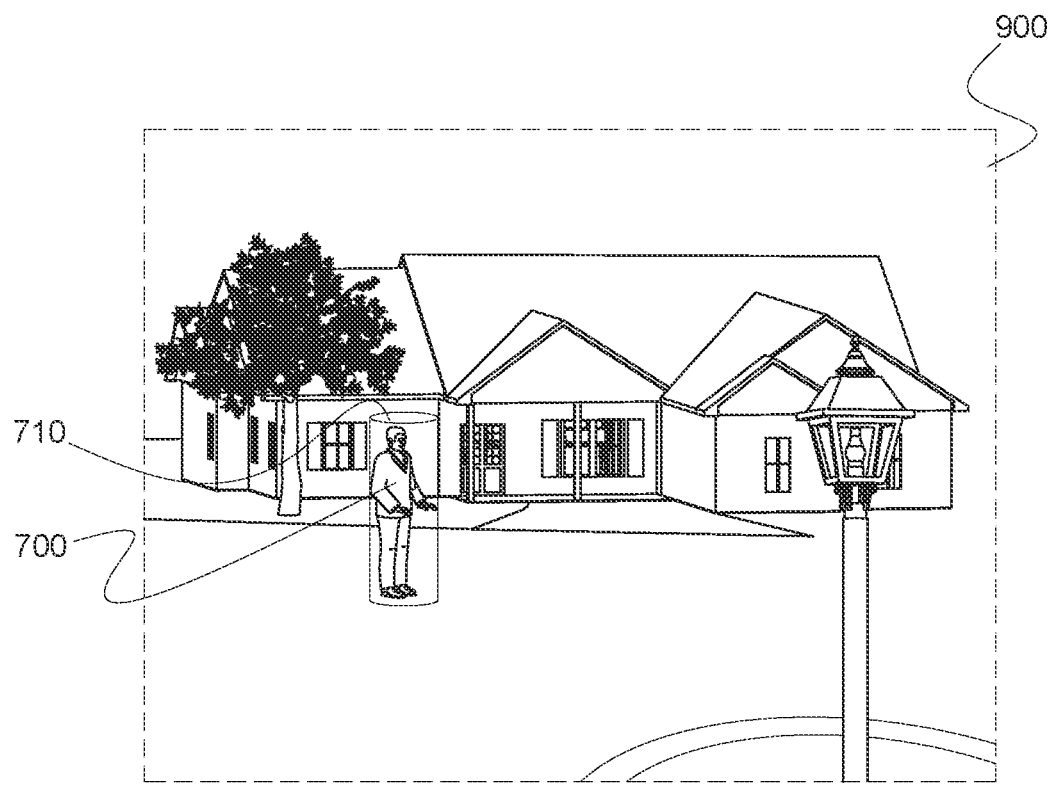
FIGS. 7A-C show an embodiment of image frames used for detecting a moving object.
Figure 7B:
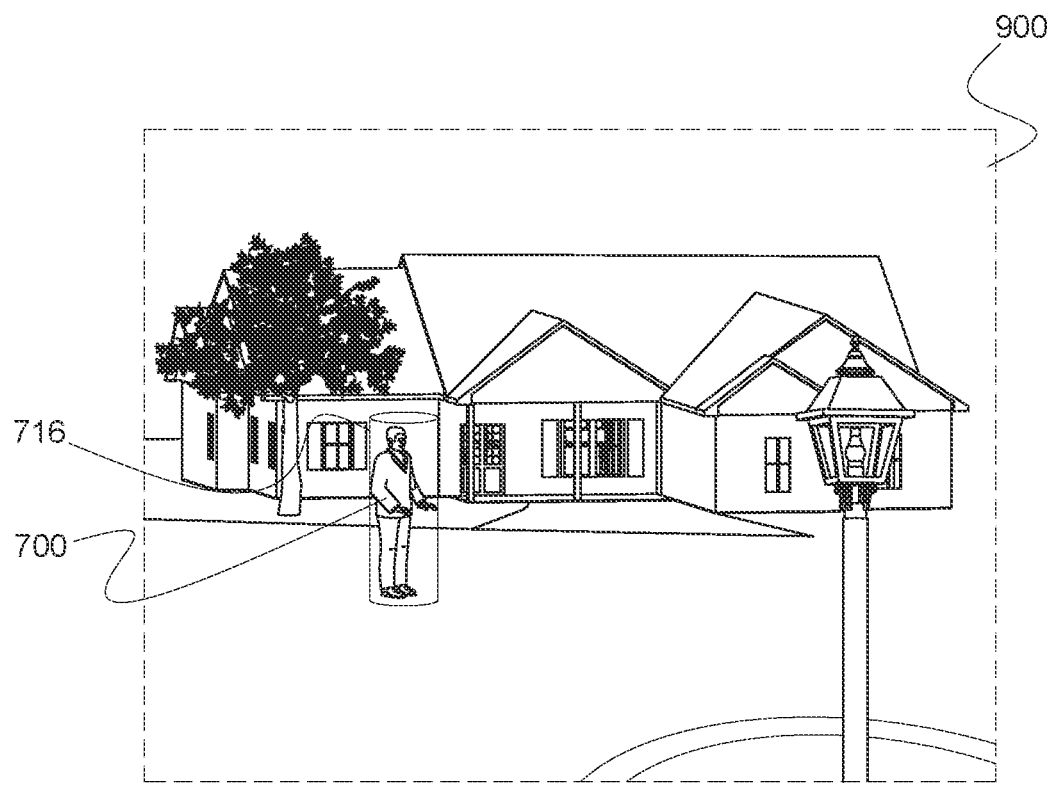
Figure 7C:
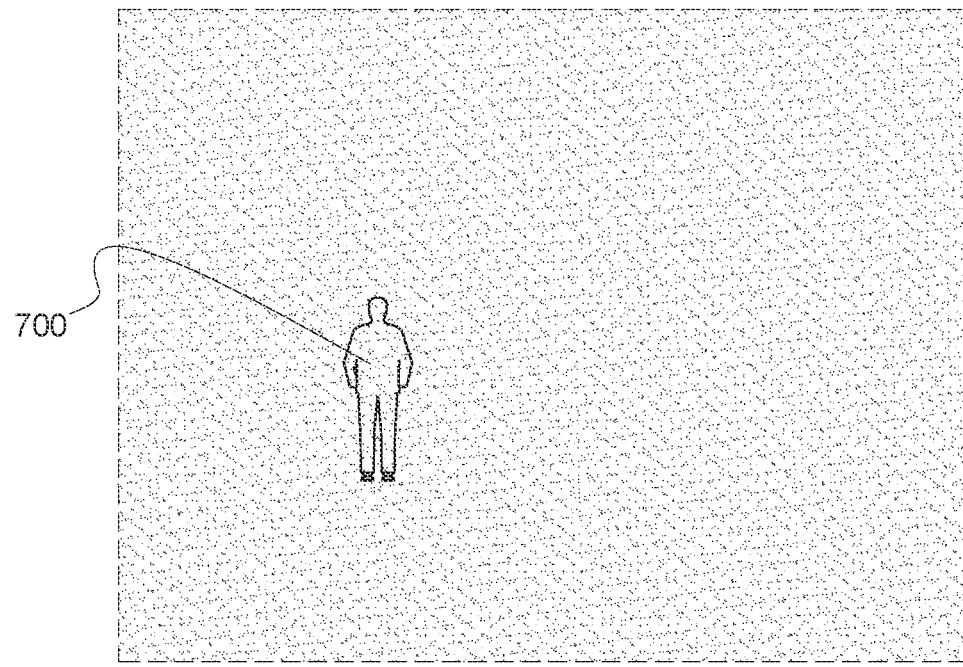

FIGS. 7A-C show an embodiment of image frames used for detecting a moving object. Three frames as shown, FIG. 7A, FIG. 7B and FIG. 7C. If movement is detected in Frame 1, FIG. 7A, a box 710, or bounding box is placed around the detected object (moving object) 700, as the moving object continues to move, as shown in Frame 2, FIG. 7B. Referencing the Delta Frame, FIG. 7C, the method provides for subtracting the image in Frame 1 from the image in Frame 2, specifically the area within the box 710 in Frame 2. If movement is detected, the resulting image is a pixel representation of the object 700 showing pixels and since the object 700 is in motion, the pixels is of the object 700 in motion.

Figure 8:
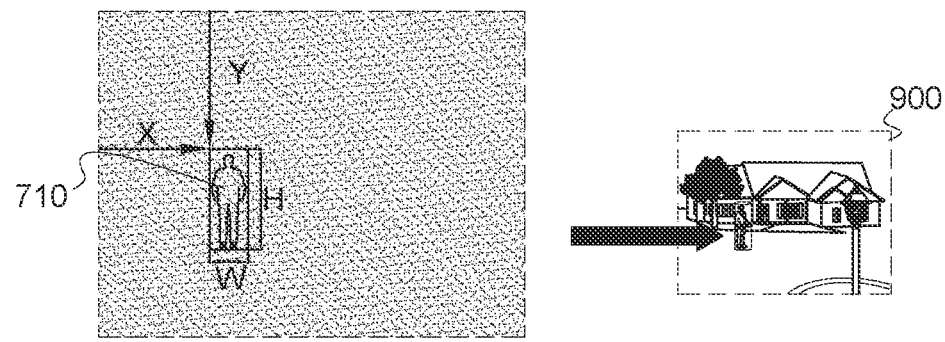
FIG. 8 shows additional details of the Delta Frame.

FIG. 8 shows additional details of the Delta Frame. When movement is detected, with X and Y pixel coordinates of the bounding box 710 are provided in the upper left-hand corner of the image and width (W) and height (H) pixel distances are also shown that define the boundaries of the bounding box over the movement object detected. The method then uses the X, Y, W and H parameters to place the bounding box 710 over the area in the original RGB (color) video Frame 2 where the movement of an object 700 was detected.

Figure 9:
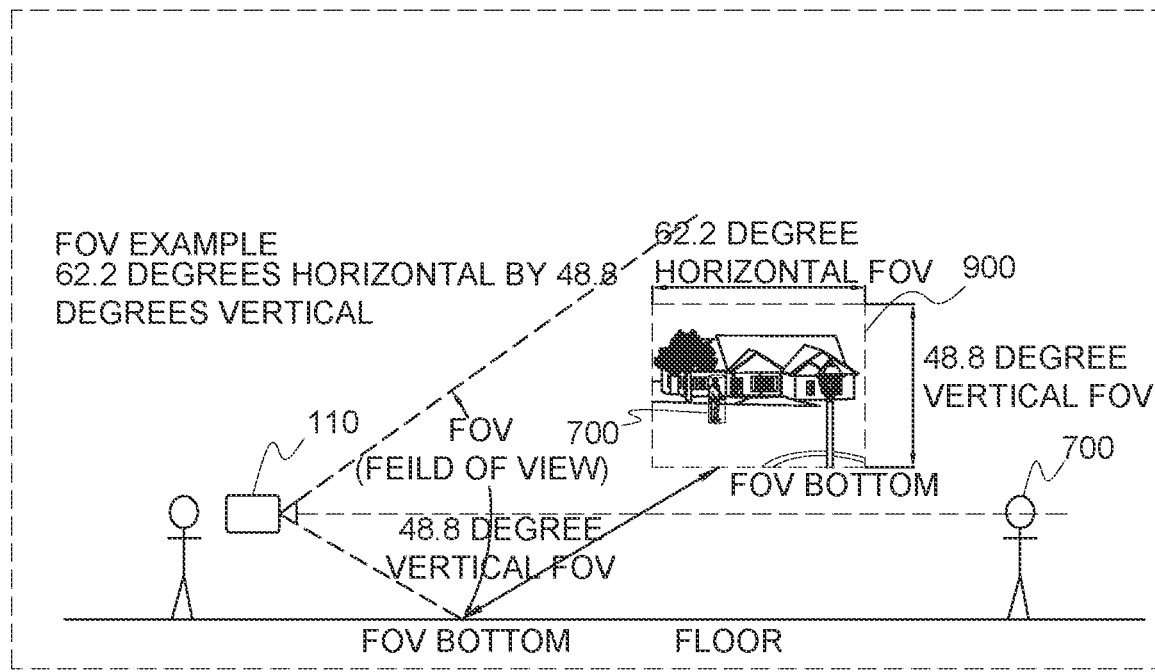
FIG. 9 provides a view of the image with a moving object within the image.

FIG. 9 provides a view of the image with a moving object 700 within the image 900. As shown, a field of view ("FOV") of the imaging sensor 110 is provided. Also shown is the FOV bottom or picture floor and the moving object 700. To determine the range of the moving object 700, width and height measurement estimates may be used in combination with reference assets in the image 900. Using trigonometric equations, the range may be determined. Trigonometric equations such as, but not limited to, those equations involving a right triangle and tangent relationship equations (sine, cosine and tangent equations) particular to the right triangle, provides a series of methods to allow to easily calculate and measure angles and distances in triangles. To understand the use of these equations, viewing planes are provided below to show how and where the trigonometric equations may be utilized.

Figure 10:
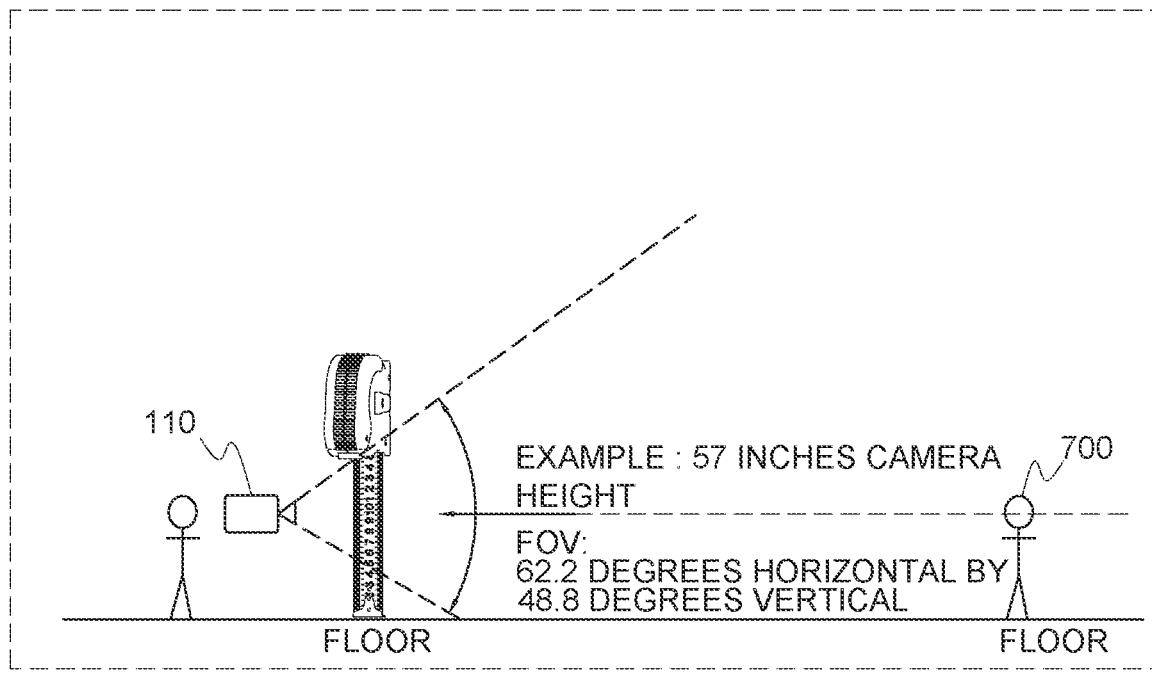
FIG. 10 shows further details regarding a step in the method shown in FIG. 6.

FIG. 10 shows further details regarding a step in the method shown in FIG. 6. A height of the imaging sensor 110 may be measured from the ground (floor) plane 1010 across which the moving object 700 may traverse such as, but not limited to, walking or crawling. In the embodiment of FIG. 10, the measurement is 57 inches.

Figure 11:
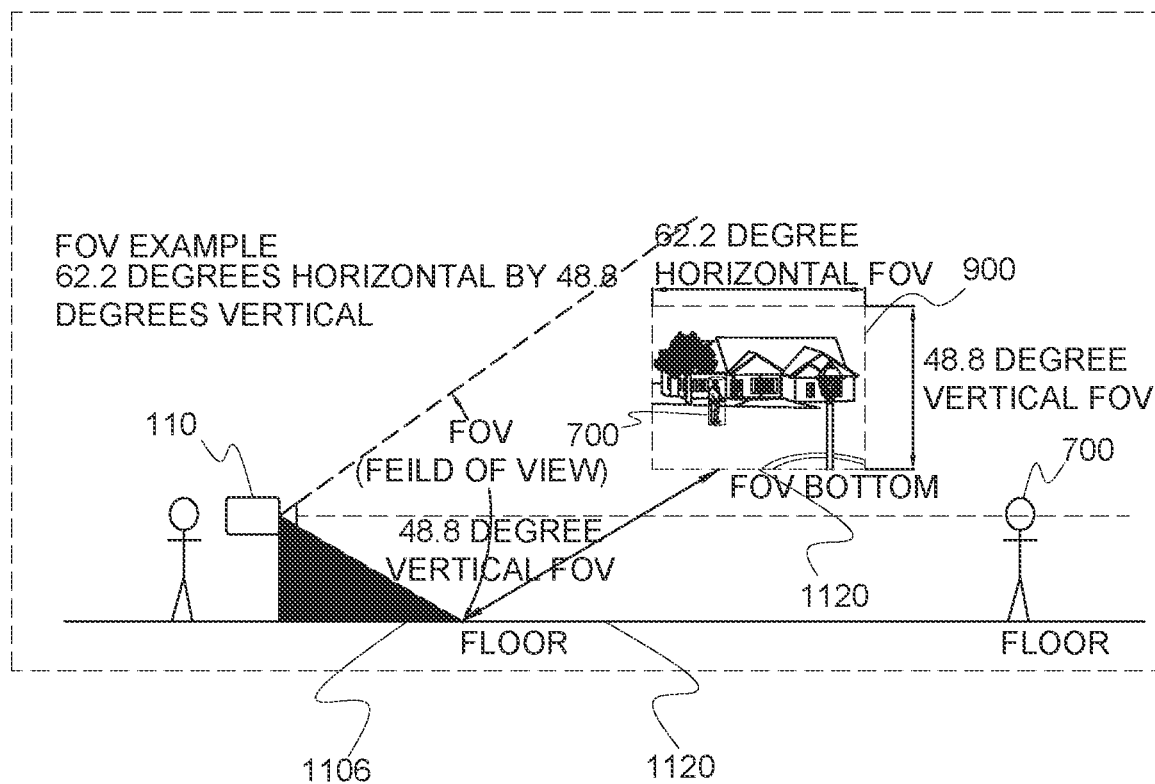
FIG. 11 shows further details regarding another step in the method shown in FIG. 6.

FIG. 11 shows further details regarding another step in the method shown in FIG. 6. A numerical foundation, based on a first triangle 1100 shown, factoring in the height of the imaging sensor 110 and a vertical field of view ("FOV") measured from the center of the sensor 110 to the FOV bottom/floor 1120 of the image 900 which is half of the FOV vertical aspect of the image 900. Thus, as shown in FIG. 11, the FOV vertical aspect is 48.8 degrees hence the FOV bottom/floor 1120 is 24.4 degrees.

The trigonometric tangent equation Tangent 0=Opposite Side/Adjacent Side may be applied. Thus, Tangent 0 for 24.4 degrees is 0.4536. As discussed above, the opposite side or camera lens (imaging sensor 110) height in the embodiments is 57 inches.

The Adjacent side (distance from camera "foot" to the FOV bottom) may be determined using right angle triangle equations as follows:

Adjacent Side $b$=Opposite Side $a$/Tan 24.4°=57 inches/0.4536=125.7 inches.

Thus, the camera's FOV and the Y+H GPU pixel position of the moving objects "foot" location as determined by the GPU's and measurement of the video frames may be determined where in the non-limiting example disclosed herein the distance from the camera 110 "foot" to the FOV bottom/floor 1120 is 125.7 inches.

Figure 12:
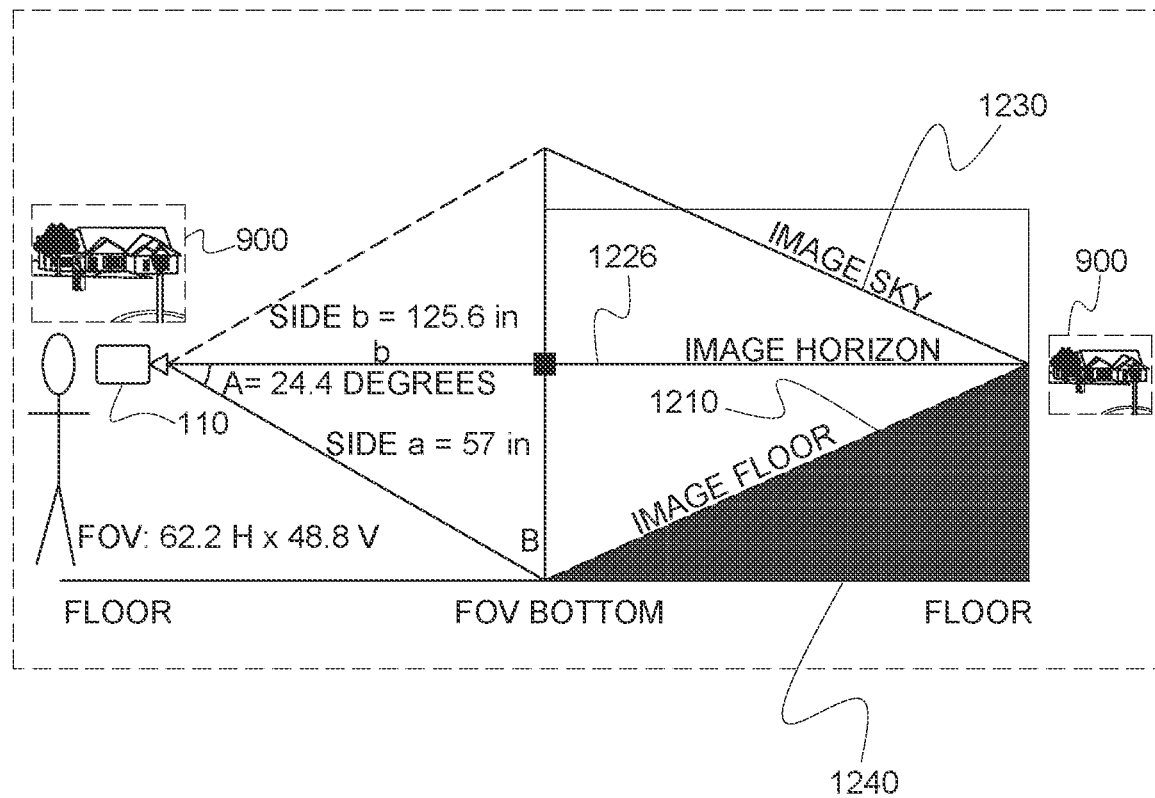
FIG. 12 shows an embodiment of a side look view of an image viewing plan.

FIG. 12 shows an embodiment of a side look view of an image viewing plan. As shown, the image floor 1210 extends or ramps upward towards the image horizon 1220. This is due to the image 900 as viewed by the camera or imaging sensor 110 and human eye optics effects. More specifically, FIG. 12 depicts the camera image 900 as stored in a memory storage device in communication or used with the GPU. With an aspect of 500×375 pixels, it can be seen that the vertical 375 pixels go from the image sky 1230 region to the image horizon 1220 and finally to the image floor 1240.

The horizons vertical pixel position is half of 375 or 187.5 pixels. Since the objective is to detect the moving object 700 in a swimming pool, the image space above the horizon is not utilized as the moving objects in that location are objects that fly (e.g., birds, planes, etc.). Therefore, the moving objects 700 of interest in the embodiments herein are moving across the image floor 1240 (pool space) and are therefore limited to the GPU vertical pixel positions of 187.5 down to vertical pixel position 375. There is a linear image space to GPU pixel position space that can be correlated to the identified moving objects' foot locations and from there, range may be determined.

Figure 13:
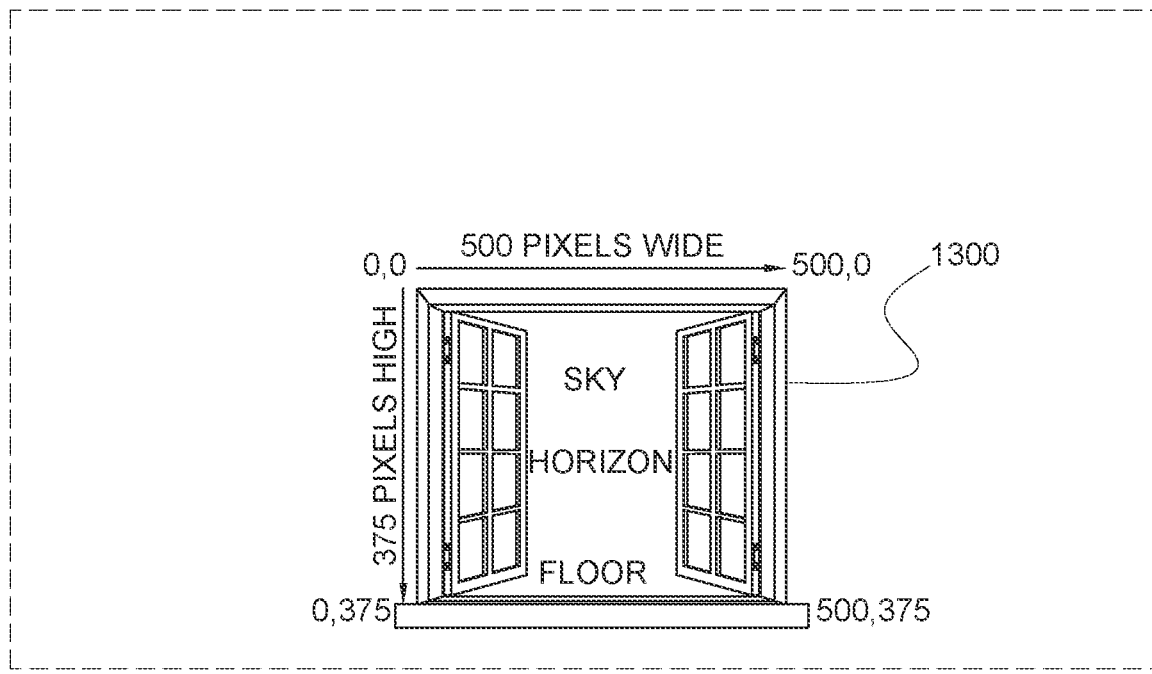
FIG. 13 shows an embodiment of an image viewing plane.
Figure 14:
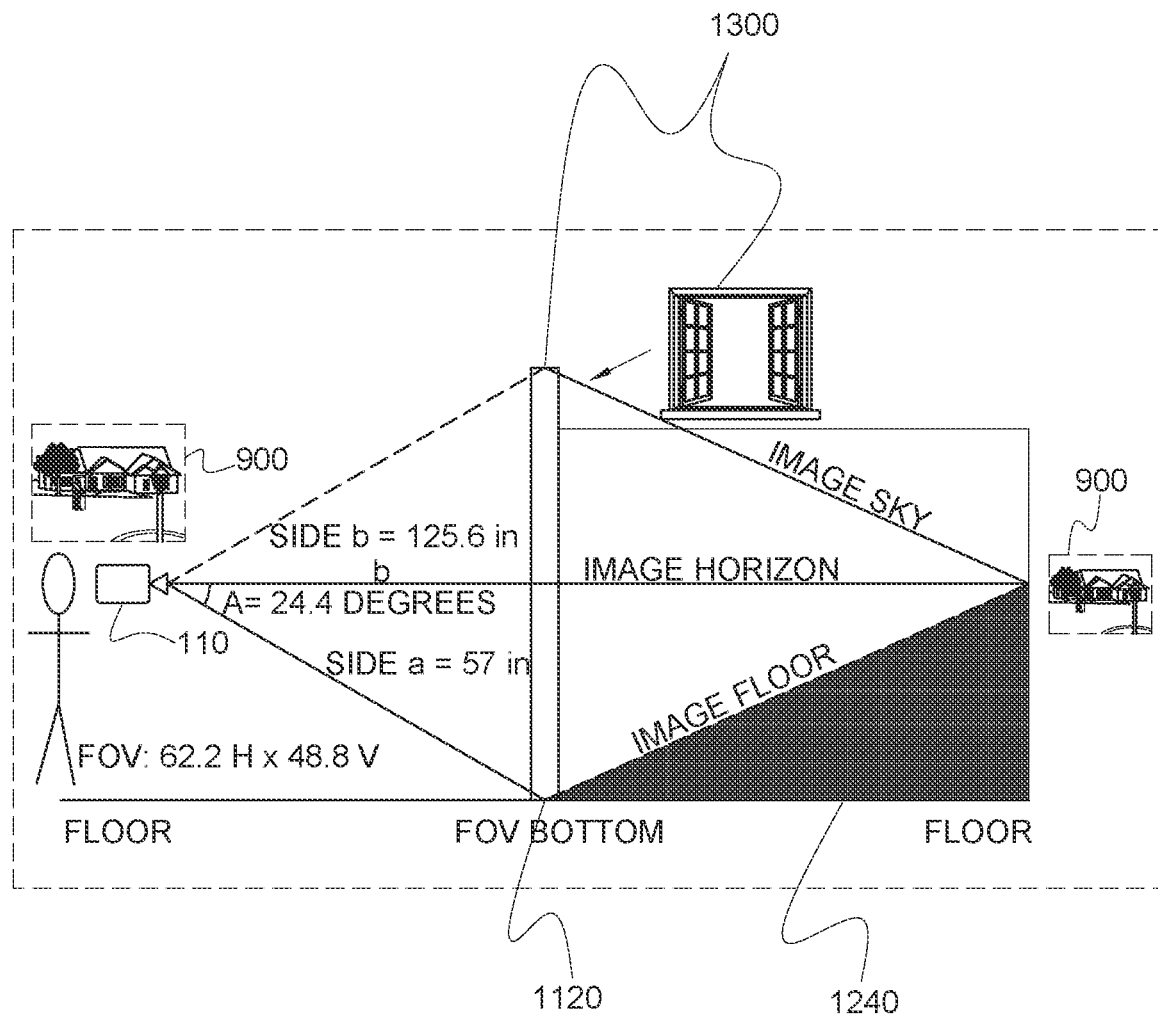
FIG. 14 shows the utilization of the image viewing plane in FIG. 13.

FIG. 13 shows an embodiment of an image viewing plane and FIG. 14 shows the utilization of the image viewing plane in FIG. 13. In FIG. 13, the image viewing plane 1300 is taken from a view of the camera or imaging sensor 110 looking towards the scene 700 discussed above. The image viewing plane 1300 is shown where the upper left-hand corner of the image 700 starts with numbered pixel 0 (in the left-to-right X axis) progressing to the right to numbered pixel 499 (of a 500-pixel width image). Similarly, the Y axis begins in the top left corner and extends downward, going from 0 to 374 (of a 375-pixel height image). The embodiment of the moving object 700 shown in FIG. 8 provides for parameters of X: 80, Y: 171, W: 47, and H: 89. As shown, the pixel sizing is provided. In this non-limiting example, the pixels high are 375 and the pixels wide are 500. Also shown is the floor 1240, applicable to the embodiments herein, a horizon and sky.

A range of the moving object 700 may be determined. A next step is to determine a range from the imaging device or sensor 110 to the moving object 700. Specifically, a determination of the distance from the foot or base of the camera 110 to the foot of the moving object 700 may be made. Using the parameters listed above, adding the Y pixel coordinate to the bounding box 710, the height pixel coordinate provides a base, or foot of the moving object 700 with respect to a GPU pixel location (in this example). Thus, using the parameters provided above, the foot of the moving object 700 is as follows:

$$Y+H=171+89=260$$

Thus, the imaging sensor 110 detects the moving object 700 moving across the image viewing plane floor 1240 which exists from the horizon down to FOV bottom 1120. In the non-limiting example provided herein, the GPU image vertical coordinates are 187 pixels down to 375 pixels. The method may be fine-tuned so that the type of movement detected is the moving object 700 walking (moving at redetermined velocity or acceleration), whether walking or crawling. Therefore, as a non-limiting example, if wind blows leaves across the floor at a velocity or acceleration outside the intended range, the leaves are not identified as a moving object.

When the moving object 700 is detected by the GPU, further steps are taken to determine additional information about the moving object 700. For example, Y+H pixel coordinates are determined to provide the moving object's floor location. In the non-limiting example discussed herein that would be from 187 to 37-pixel line location. Thus, this may be considered determining the moving object's "feet-on-floor" location within the image viewing space where feet-on-floor may be considered as the moving object's "range to target" or "measure to" point from the camera lens. To simplify the method, applying a "flat Earth" viewing plane may be used instead.

Figure 15:
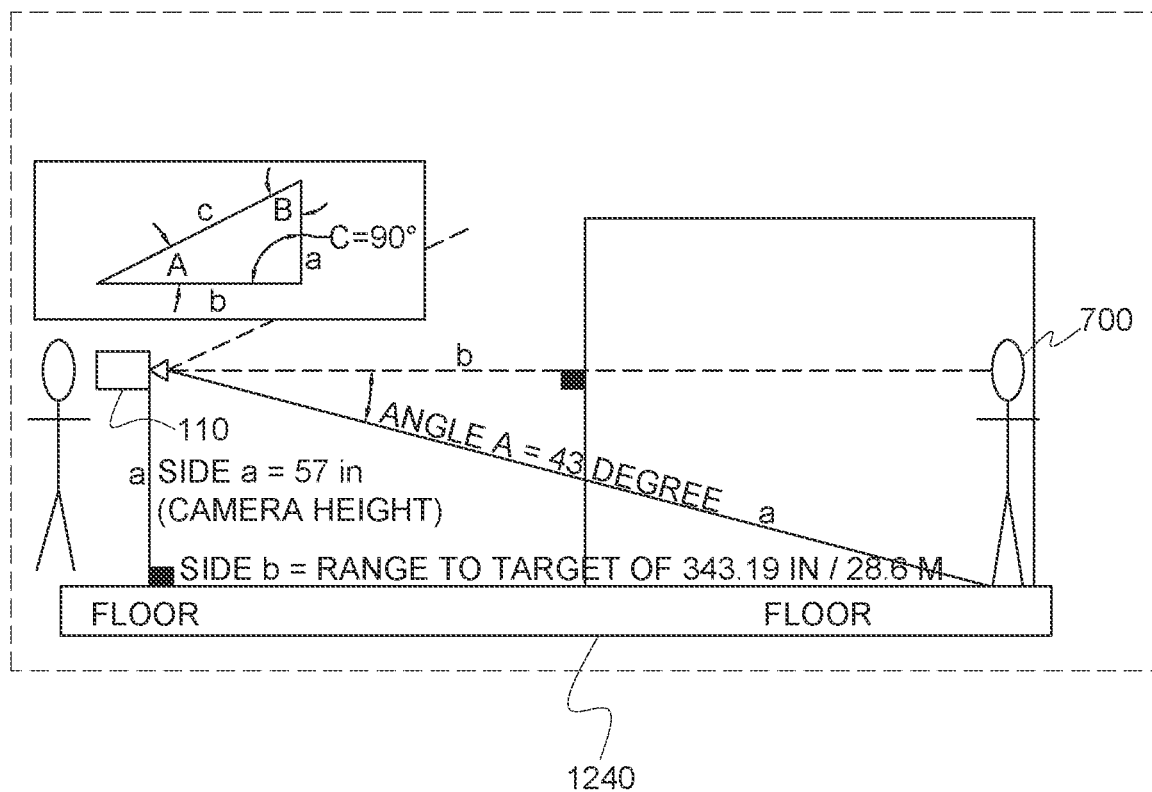
FIG. 15 shows a flat Earth measurement perspective versus lens distorted viewing perspective.

FIG. 15 shows a flat Earth measurement perspective versus lens distorted viewing perspective. Having the floor viewing space, from the horizon down to the FOV bottom 1120, there is a linear space from 187 pixels to 375 pixels that directly correlates from 0 to 24.4 degrees (half FOV angle, for example). With this information, an angle from a pixel ratio may be calculated using the following equation:

$$(1((375-\text{GPU foot coordinate}/187.5))\times24.4 \text{ degrees}$$

Thus, if the GPU foot pixel location is 260, the angle is determined as follows:

$$(1-((375-260)/187.5))\times24.4=9.43 \text{ degrees}$$

Applying right triangle equations as the camera height was identified above, 57 inches and with Angle A now known, 943 degrees, Side b range to target distance is determined, 343.19 inches or 28.6 feet from the camera lens as determined with the equation below:

$$\text{Adjacent Side } b=\text{Opposite Side } a/\text{Tan } 9.43°=57 \text{ inches}/0.16609=343.19 \text{ inches or } 28.6 \text{ feet}$$

This determination assumes that the image floor is a flat, level surface devoid of hills, valleys, drop-offs, etc.

Next, the moving object's width (W) and height (H) are determined. From the GPU, the W and H pixel dimensions are known. From the non-limiting exampled disclosed herein, the width is 47 pixels and the height is 88 pixels. To determine inches per pixel, with the range measurement, the specific width and height may be determined as follows:

$$\text{Horizontal inch per pixel measurement}=(\text{Side } b(\text{Range-to-Target})\times(\text{Tan } 62.2°/2))/(500 \text{ pixels Wide image}/2)=(343.19 \text{ inches}\times0.6032)/250=0.828 \text{ inches per pixel}$$

$$\text{Vertical inch per pixel measurement}=(\text{Side } b(\text{Range-to-Target})\times(\text{Tan } 48.8°/2))/(375 \text{ pixels Tall image}/2)=(343.19 \text{ inches}\times0.4536)/187.5=0.830 \text{ inches per pixel}.$$

Thus, with 47 pixels wide=47×0.828 inches per pixel=38.91 inches moving object width and with 88 pixels tall=73.06 inches (6 feet, 1 inch) Moving Object (human) height.

The inventors determined that this process accurately works for only flat and level surfaces (like pools and their pool decks). Accuracy degrades when non-flat non-level, sloping hills and valleys are introduced across the image scene. Thus, measurement estimate accuracy cannot be guaranteed.

The embodiments disclosed above using right triangle trigonometry may be used in association with other sensors/detectors disclosed herein.

Computational Hardware Overview

Figure 16:
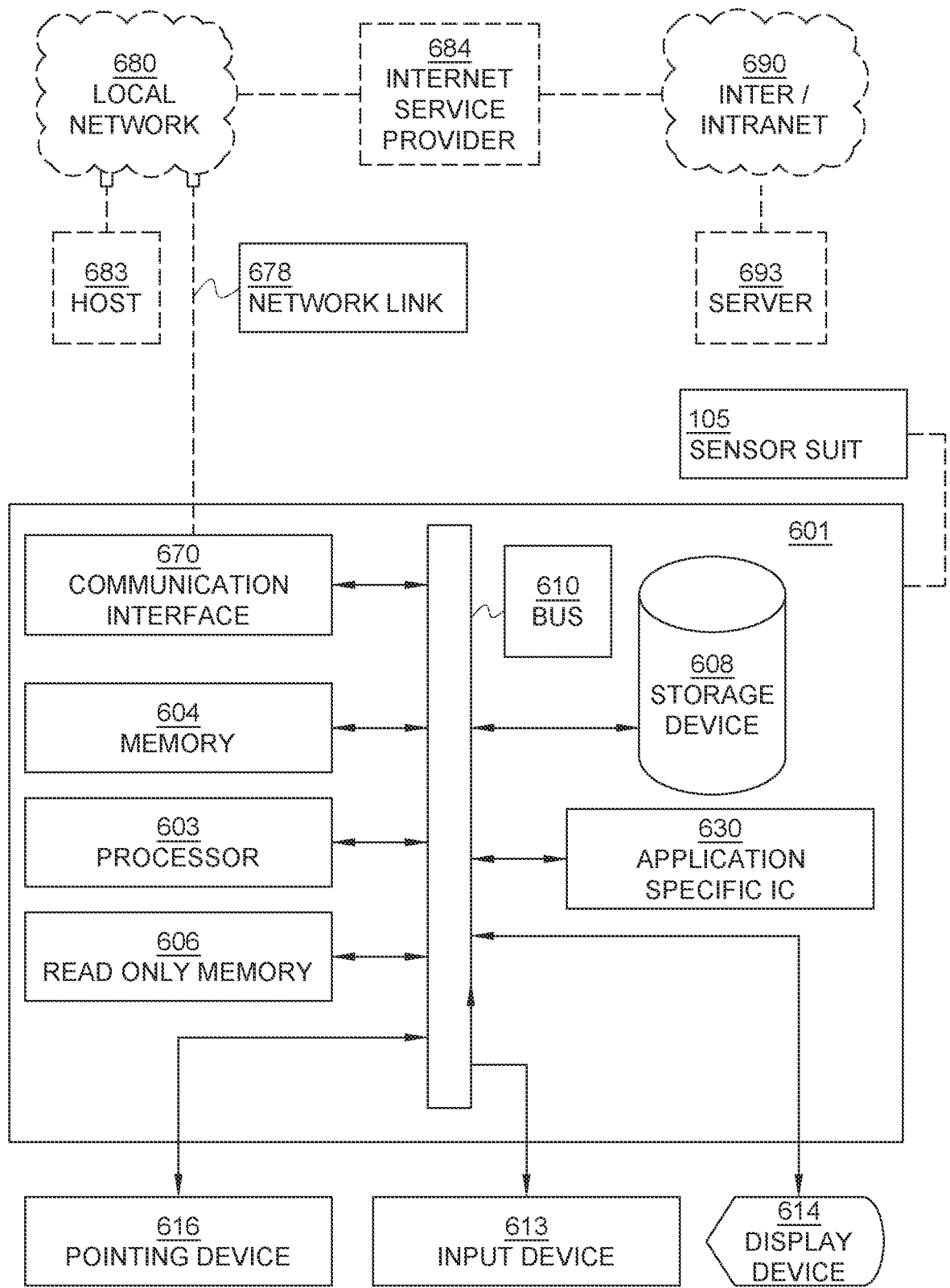
FIG. 16 illustrates a block diagram of a computer system in communication with a network.

FIG. 16 illustrates a block diagram of a computer system 601 (i.e., computer system 101) in communication with a network. The block diagram of FIG. 6 illustrates a computer system 601 (i.e., computer system 101) upon which an embodiment of the invention may be implemented or employed. Computer system 601 includes a communication mechanism such as a bus 610 for passing information between other internal and external components of the computer system 601. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 601, or a portion thereof, constitutes a means for performing one or more steps of one or more methods described herein.

A sequence of binary digits constitutes digital data that is used to represent a number or code for a character. A bus 610 includes many parallel conductors of information so that information is transferred quickly among devices coupled to the bus 610. One or more processors 603 for processing information are coupled with the bus 610. A processor 603 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 603 constitutes computer instructions.

Computer system 601 also includes a memory 604 coupled to bus 610. The memory 604, such as a random access memory (RAM) or other dynamic storage device, stores information including computer instructions. The memory 604 may also include dynamic memory which allows information stored therein to be changed by the computer system 601. RAM allows a unit of information stored at a location called a memory address to be stored and retrieved independently of information at neighboring addresses. The memory 604 is also used by the processor 603 to store temporary values during execution of computer instructions. The computer system 601 also include a read only memory (ROM) 606, non-volatile persistent storage device or static storage device coupled to the bus 610 for storing static information, including instructions, that is not changed by the computer system 601. The ROM 606 may be a secure byte-addressable memory (storage) device or a direct-access for files (DAX) memory device. The bus 610 may also have coupled thereto other storage devices including a non-volatile (persistent) storage device, such as a magnetic disk or optical disk, for storing information, including instructions, that persists even when the computer system 601 is turned off or otherwise loses power.

Information, including instructions, is provided to the bus 610 for use by the processor from an external input device 612, such as a keyboard containing alphanumeric keys operated by a human user, or a sensor. A sensor detects conditions in its vicinity and transforms those detections into signals compatible with the signals used to represent information in computer system 601. Other external devices coupled to bus 610, used primarily for interacting with humans, include a display device 614, such as a cathode ray tube (CRT) or a liquid crystal display (LCD), light emitting diode (LED) displays, for presenting images, and a pointing device 616, such as a mouse or a trackball or cursor direction keys, for controlling a position of a small cursor image presented on the display device 614 (i.e., display device 114) and issuing commands associated with graphical elements presented on the display 614.

In the illustrated embodiment, special purpose hardware, such as an application specific integrated circuit (IC) 620, may be coupled to bus 610. The special purpose hardware may be configured to perform operations not performed by processor 603 quickly enough for special purposes. Examples of application specific ICs include Graphics Processing Units (GPU) 620 for generating images for display device 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 601 also includes one or more instances of a communications interface 670 coupled to bus 610. Communication interface 670 provides a two-way communication coupling to a variety of external devices that operate with their own processors, such as printers, scanners and external disks. For example, the communication interface 670 may interface with the sensor suite 205 (FIG. 2) wherein applications 207 (FIG. 2) are configured to be stored in memory 604, 606 and/or storage device 608 and executed by processor 603 to perform the functions described herein.

In general, the computer system 601 through the communication interface 670 may be coupled with a network link 678 that is connected to a local network 680 to which a variety of external devices with their own processors are connected. In some embodiments, the local network 680 may be a private network and may include wired and/or wireless communications. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 may be a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 670 sends and receives electrical, acoustic or electromagnetic signals, including infrared and optical signals, that carry information streams, such as digital data. Communication interfaces between one or more user interfaces (i.e., devices 613, 614 and 616) may communicate via communication interface 670 using BLUETOOTH, WIFI, and/or near field wireless communication modalities. Communications from computing system 601 with in-range mobile devices 30A or computing devices 30B may use BLUETOOTH, WIFI, and/or near field wireless communication modalities. Distributed components of the computing system 101 may communicate via BLUETOOTH, WIFI, and/or near field wireless communication modalities. The term computer-readable medium is used herein to refer to any medium that participates in providing information to processor 603, including instructions for execution. Such a medium may take many forms, including, but not limited to, non-volatile media, volatile media and transmission media. Non-volatile media include, for example, optical or magnetic disks, such as storage device. Volatile media include, for example, dynamic memory 604. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 603, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 603, except for carrier waves and other signals.

Logic encoded in one or more tangible media includes one or both of processor instructions on a computer-readable storage media and special purpose hardware, such as ASIC 620.

Network link 678 typically provides information communication through one or more networks to other devices that use or process the information. For example, network link 678 may provide a connection through a private or local network 680 to a host computer 682, such as a secure host computer. For example, in some embodiments, the pilot may be located at the host computer 682. Thus, the user interfaces referenced in FIG. 6, may be located with the host computer 682. In some embodiments, the computer system 601 may be positioned with the sensor suite 105 while the host computer 682 is a remote from the sensor suite. The computer system 601 may be located on support structure 102. The host computer 682 may be located within a building or residence. The host computer 682 and the computer system 601 may be configured as a distributed embodiment of computing system 101.

In some embodiments, the computer system 601 may connect to equipment 684 operated by an Internet Service Provider (ISP) or Intranet Service Provider. ISP equipment 684 in turn provides data communication services through the public, world-wide packet-switching communication network of networks now commonly referred to as the Internet 690 or alternately over an Intranet. The computing system 101 may access local environmental data over the Internet 690.

A computer called a server 692 connected to the Internet or Intranet provides a service in response to information received over the Internet or Intranet. For example, server 692 provides information representing video data for presentation at display 614 or the server may receive information representing video data for display at a location remote from the system 100 (FIGS. 1A and 1B).

The invention is related to the use of computer system 601 for implementing the techniques described herein. According to one embodiment of the invention, those techniques are performed by computer system 601 in response to at least one processor 603 executing one or more sequences of one or more instructions contained in memory 604 to form a computer program product. Such instructions, also called software and program code, may be read into memory 604 from another computer-readable medium such as storage device 608. Execution of the sequences of instructions contained in memory 604 causes processor 603 to perform the method and functions described herein. In alternative embodiments, hardware, such as application specific integrated circuit 620, may be used in place of or in combination with software to implement the invention. Thus, embodiments of the invention are not limited to any specific combination of hardware and software.

Computer program code for carrying out operations described above may be written in a variety of programming languages, including but not limited to a high-level programming language, such as without limitation, Python, C or C++, for development convenience. In addition, computer program code for carrying out operations of embodiments described herein may also be written in other programming languages, such as, but not limited to, interpreted languages. The program code may include hardware description language (HDL) or very high-speed integrated circuit (VHSIC) hardware description language, such as for firmware programming. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a non-transitory, tangible computer-readable storage medium such as a magnetic tape, a flexible disc, a hard disc, a compact disc, a photo-magnetic disc, a digital versatile disc (DVD) or the like.

The signals transmitted over network link 678 and other networks through communications interface 670, carry information to and from computer system 601. Computer system 601 can send and receive information, including program code, through the networks 680, 690 among others, through network link 678 and communications interface 670. In an example using the Internet 690, a server 692 transmits program code for a particular application, requested by a message sent from computer system 601, through Internet 690, ISP equipment 684, local network 680 and communications interface 670. The received code may be executed by processor 603 as it is received or may be stored in storage device 608 or other non-volatile storage for later execution, or both. In this manner, computer system 601 may obtain application program code in the form of a signal on a carrier wave. The host computer 682 may control the computing system 601 in some instances.

Various forms of computer readable media may be involved in carrying one or more sequence of instructions or data or both to processor 603 for execution. For example, instructions and data may initially be carried on a magnetic disk of a remote computer such as host computer 682. The remote computer loads the instructions and data into its dynamic memory and sends the instructions and data over a telephone line using a modem. A modem local to the computer system 601 receives the instructions and data on a telephone line and uses an infra-red transmitter to convert the instructions and data to a signal on an infra-red a carrier wave serving as the network link 678. An infrared detector serving as communications interface 670 receives the instructions and data carried in the infrared signal and places information representing the instructions and data onto bus 610. Bus 610 carries the information to memory 604 from which processor 603 retrieves and executes the instructions using some of the data sent with the instructions. The instructions and data received in memory 604 may optionally be stored on storage device 608, either before or after execution by the processor 603.

The memory 604 may have stored thereon applications 207 (FIG. 2) implemented as software or computer instructions. The applications when executed by the processor 603 may perform one or more functions as described herein. In FIG. 2, a dedicated processor 220 may be provided for processing the captured images by the IR image sensors 110.

Figure 17:
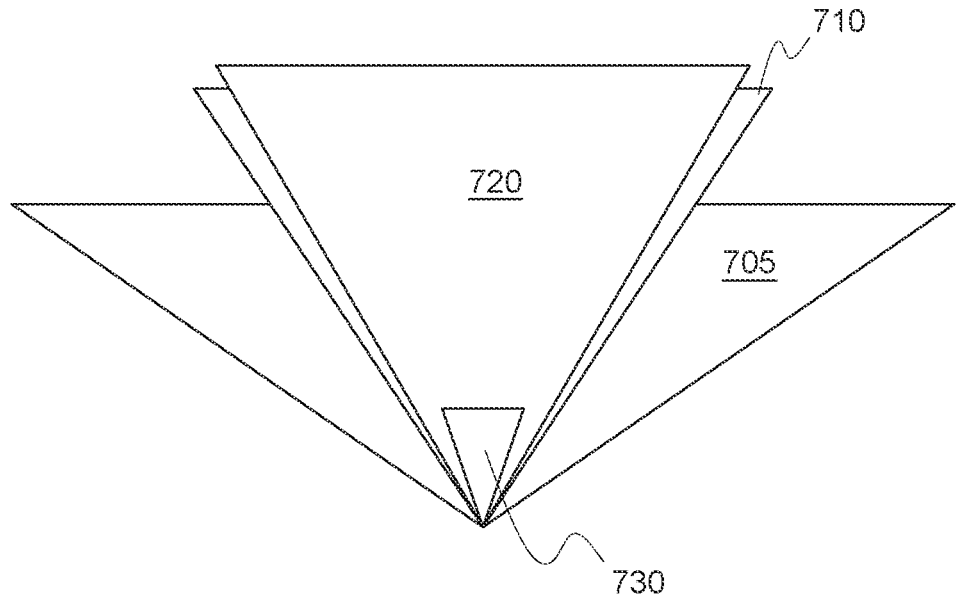
FIG. 17 illustrates a configurable sector sensing pattern.

FIG. 17 illustrates a configurable sector sensing pattern 700. A sector may be a quadrant in some examples. However, for systems 100 which monitor areas less than 360°, the monitored may be sectorized into adjacent sectors. In the pattern 700, area 705 may be the FOV of a passive IR imaging sensor 110. In the pattern 700, area 710 may be the FOV of a Pixy RGB imaging sensor or camera. In the pattern 700, area 720 may be the FOV of a NoIR imaging sensor or camera. In the pattern 700, area 730 may be the FOV of the ultrasonic ranging sensor 360. In some embodiments, the system 100 may use different FOVs than those shown in FIG. 17.

The system 100 may include lighting such as flood lighting or IR LEDS for imaging at night.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A swimming pool monitoring system comprising:
an imaging sensor suite for detecting the presence of an object within a defined perimeter of the swimming pool wherein the imaging sensor suite comprises at least one infrared imaging sensor and at least one red, green, blue (RGB) imaging sensor;
at least one local ambient environment condition sensor to sense a quantity of ambient light in an environment of the swimming pool being monitored by the imaging sensor suite to determine at least one of: a mode for the at least one infrared imaging sensor to operate and whether to use the at least one RGB imaging sensor;
a computer system operatively coupled to the imaging sensor suite with a non-transitory computer readable medium storing a program causing the computer system to execute processing to determine when an object is moving within a field of view of the imaging sensor suite once detected by the imaging sensor suite, to determine an angle of the object relative to the imaging sensor suite and to determine a range of the object relative to the imaging sensor suite to include a determination of a size of the object for providing an alarm when the object approaches within a predetermined distance of an edge of the swimming pool; and
a plurality of sensor systems comprising at least an olfactory sensor coupled to the computer system, wherein the computer system further comprises a data storage device including a database of olfactory signatures associated with authorized objects for comparison to olfactory signatures detected by the olfactory sensor, the computer system providing an alarm in response to unauthorized signatures.

2. The swimming pool monitoring system of claim 1, wherein to determine the range of the object, a field of view at a bottom of an image frame taken by the imaging sensor suite is determined with right triangle trigonometric equations.

3. The swimming pool monitoring system of claim 1, wherein the plurality of sensor systems further comprises an auditory sensor for detecting sounds within the perimeter of the swimming pool and the computer system includes a voice identification system for identifying authorized voices within the swimming pool perimeter and responding to commands from the authorized voices.

4. The swimming pool monitoring sensor of claim 1, further comprising an ultrasonic range sensor for determining a range of a live object from the edge of the swimming pool.

5. The swimming pool monitoring system of claim 1, wherein the computer system inhibits the alarm if an authorized live object is in juxtaposition with an unauthorized live object.

6. The swimming pool monitoring system of claim 1, wherein the computer system includes a data input function coupled to the imaging sensor suite for enabling selected captured images to be stored in the data storage whereby a plurality of predetermined images of objects may be updated for additional authorized and unauthorized objects.

7. The swimming pool monitoring system of claim 1, wherein the local ambient environment condition sensor is a sensor suite comprising an ambient lighting sensor and at least one of a temperature sensor, a humidity sensor, and a weather detection sensor.

8. The swimming pool monitoring system of claim 1, wherein the at least one infrared imaging sensor is coupled to at least one lens and wherein the at least one lens comprises a dome shape.

9. The swimming pool monitoring system of claim 1, wherein the at least one infrared imaging sensor is coupled to at least one lens and wherein the at least one lens comprises a Fresnel lens.

10. The swimming pool monitoring system of claim 9, wherein the at least one lens comprises a plurality of Fresnel lenses arranged in a dome shape.

11. A swimming pool monitoring system comprising:
an imaging sensor suite, with at least one infrared imaging sensor and at least one red, green, blue (RGB) imaging sensor, with a known distance to a base surface;
at least one local ambient environment condition sensor to sense a quantity of ambient light in an environment of the swimming pool being monitored by the imaging sensor suite to determine at least one of: a mode for the at least one infrared imaging sensor to operate and whether to use the at least one RGB imaging sensor;
a computer system with a non-transitory computer readable medium storing a program causing the computer system to execute processes to receive image frames from the imaging sensor suite, to detect an object within a field of view of the imaging sensor suite when comparing image frames at a horizon of each image frame to a floor of each image frame, to determine a range of the object from the imaging sensor suite, and to determine a width and height of the object with right triangle trigonometric equations;

an alarm system in communication with the computer system to sound at least one of an audible, visual, and tactile alarm emitting from at least one of the computer system and a remote device when determined that the object is entering into a predetermined perimeter area around the swimming pool relative to the imaging sensor suite; and a plurality of sensor systems comprising at least an olfactory sensor coupled to the computer system, wherein the computer system further comprises a data storage device including a database of olfactory signatures associated with authorized objects for comparison to olfactory signatures detected by the olfactory sensor, the computer system or the remote device providing an alarm in response to unauthorized signatures.

12. The swimming pool monitoring system of claim 11, wherein the non-transitory computer readable medium storing the program further causes the computer system to determine at least one of whether the object has limbs and whether the object is at least one of walking and crawling.

13. The swimming pool monitoring system of claim 12, wherein to determine whether the object is at least one of walking and crawling is based on the object moving at at least one of a predetermined velocity and a predetermined acceleration.

14. A computerized method to monitor a swimming pool for a moving object, the computerized method comprises a computer system comprising a non-transitory computer readable medium storing a program causing the computer system to execute processes to image an area of interest with a stationary imaging sensor suite wherein to image the area is determined by information from a sensor which is used to select a type of imaging sensor of the imaging sensor suite to use, wherein the imaging sensor suite comprises at least one infrared imaging sensor and at least one red, green, blue (RGB) imaging sensor; detect a moving object within the field of view of the imaging sensor suite; and determine a range of the object relative to the imaging sensor suite utilizing an angle of the object from the imaging sensor suite and a position of the imaging sensor suite relative to a base, wherein a plurality of sensor systems comprising at least an olfactory sensor is coupled to the computer system, wherein the computer system further comprises a data storage device including a database of olfactory signatures associated with authorized objects for comparison to olfactory signatures detected by the olfactory sensor, wherein the non-transitory computer readable medium storing a program causing the computer system to execute processes to provide an alarm in response to unauthorized signatures.

15. The computerized method of claim 14, further comprising the non-transitory computer readable medium storing a program causing the computer system to execute processes to determine the range of the object, a field of view at a bottom of an image frame taken by the imaging sensor suite is determined with right triangle trigonometric equations.

16. The computerized method of claim 14, further comprising the non-transitory computer readable medium storing a program causing the computer system to execute processes to compare image frames taken by the imaging sensor suite at a horizon of each image frame to a floor of each image frame to determine the range of the object from the imaging sensor suite, and to determine a width and height of the object with right triangle trigonometric equations.

* * * * *